US006292226B1

(12) United States Patent
Yamanaka et al.

(10) Patent No.: US 6,292,226 B1
(45) Date of Patent: Sep. 18, 2001

(54) BROADCAST RECEIVER SELECTIVELY USING NAVIGATION INFORMATION MULTIPLEXED ON TRANSPORT STREAM AND RECORDING MEDIUM RECORDING THE METHOD OF THE SAME

(75) Inventors: Kiyokazu Yamanaka, Hyogo; Toshiya Mori; Yoshihiro Mimura, both of Osaka; Hidekazu Shimizu, Saitama; Shigeaki Watanabe, Kyoto; Tatsuya Shimoji, Osaka; Kazuo Okamura, Osaka; Junichi Hirai, Osaka; Masahiro Oashi, Osaka; Takashi Kakiuchi, Osaka; Yuki Kusumi, Nara; Yoshiyuki Miyabe, Osaka; Naoya Takao, Osaka; Kazutoshi Sumiya, Hyogo; Ikuo Minakata, Kyoto; Masayuki Kozuka, Osaka, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/051,630
(22) PCT Filed: Aug. 28, 1997
(86) PCT No.: PCT/JP97/03013
 § 371 Date: Nov. 18, 1998
 § 102(e) Date: Nov. 18, 1998
(87) PCT Pub. No.: WO98/09437
 PCT Pub. Date: Mar. 5, 1998

(30) Foreign Application Priority Data

Aug. 28, 1996 (JP) .................................... 08-226320

(51) Int. Cl.$^7$ ............................... H04N 7/00; H04N 5/46
(52) U.S. Cl. .................. 348/556; 348/460; 348/461; 348/465; 348/467; 348/473; 348/563; 348/569
(58) Field of Search .................... 348/460, 461, 348/465, 467, 468, 473, 563, 569, 556; H04N 7/00, 11/00, 7/08, 5/445, 4/46, 4/50

(56) References Cited

U.S. PATENT DOCUMENTS 5,038,211   8/1991   Hallenbeck .................... 358/142

(List continued on next page.)

FOREIGN PATENT DOCUMENTS 715463   6/1996   (EP) .

(List continued on next page.)

OTHER PUBLICATIONS

Interactive Television Broadcasting Utilizing Teletext Infrastructure, by S. Makino et al., Television Society Journal, vol. 49, No. 11, pp. 1482–1487, (1995).

(List continued on next page.)

*Primary Examiner*—Reinhard J. Eisenzopf
*Assistant Examiner*—Brian P. Yencke
(74) *Attorney, Agent, or Firm*—Price and Gess

(57) ABSTRACT

A broadcast reception apparatus is provided with a reception unit for receiving broadcast data as a transport stream. The transport stream includes video data and a plurality of navigation information sequences. Each navigation information sequence includes navigation information which includes graphics data to be combined with the video data for display. A TS (Transport Stream) decoder unit extracts the video data and navigation information from the transport stream. A reception control unit controls the TS decoder unit so that the TS decoder unit extracts navigation information from a navigation information sequence which is suitable for the the broadcast reception apparatus. A navigation information storage unit stores the navigation information extracted by the TS decoder unit. A reproduction control unit combines graphics data included in the navigation information stored in the navigation information storage unit with the video data extracted by the TS decoder unit and displays a composite image of this combination. This achieves a broadcast reception apparatus which selectively uses necessary pieces of navigation information to display an image as a user interface.

14 Claims, 30 Drawing Sheets

U.S. PATENT DOCUMENTS

| | | | |
|---|---|---|---|
| 5,400,077 | | 3/1995 | Cookson et al. ...................... 348/556 |
| 5,422,674 | | 6/1995 | Hooper et al. ......................... 348/409 |
| 5,485,221 | * | 1/1996 | Banker et al. ........................ 348/563 |
| 5,541,662 | | 7/1996 | Adams et al. ........................ 348/460 |
| 5,758,259 | * | 5/1998 | Lawler ................................. 345/906 |
| 5,818,935 | * | 10/1998 | Maa ..................................... 348/267 |
| 5,844,620 | * | 12/1998 | Coleman et al. .................... 348/461 |
| 5,856,973 | * | 1/1999 | Thompson ............................ 370/389 |
| 5,982,979 | * | 11/1999 | Omata et al. ......................... 348/563 |
| 5,995,155 | * | 11/1999 | Schindler et al. ................... 348/461 |
| 6,016,144 | * | 1/2000 | Blonstein et al. ................... 348/563 |
| 6,064,438 | * | 5/2000 | Miller .................................. 348/465 |

FOREIGN PATENT DOCUMENTS

| | | |
|---|---|---|
| 4183189 | 6/1992 | (JP) . |
| 6165139 | 6/1994 | (JP) . |
| 7123375 | 5/1995 | (JP) . |
| 96 05699 | 2/1996 | (WO) . |

OTHER PUBLICATIONS

"An Application of MPEG–2 Systems to ISDB Transport Systems," by T. Kimura et al., ITE Technical Report, vol. 18, No. 28, pp. 7–12, CE '94–20, BCS '94–14 (May 1994).

* cited by examiner

FIG. 3

| NVT(0, 1) | NVT(0, 2) | | | NVT(0, 3) |
|---|---|---|---|---|
| INPUT OPERATION : "ENTER" BUTTON VARIABLE X=0 | INPUT OPERATION : "ENTER" BUTTON AT "1" OR "3" VARIABLE X=−1 INPUT OPERATION : "ENTER" BUTTON AT "2" VARIABLE X=1 OUTPUT OPERATION : BUZZER FOR VARIABLE X=−1 CHIME FOR VARIABLE X=1 | | | VARIABLE X=0 INPUT OPERATION : "ENTER" BUTTON AT "1" OR "3" VARIABLE X=−1 INPUT OPERATION : "ENTER" BUTTON AT "2" VARIABLE X=1 OUTPUT OPERATION : BUZZER FOR VARIABLE X=−1 CHIME FOR VARIABLE X=1 |
| NVT(1, 1) | NVT(1, 2) | NVT(1, 3) | NVT(1, 4) | NVT(1, 5) |
| INPUT OPERATION : "ENTER" BUTTON VARIABLE Y=1 | DISPLAY OPERATION : DISPLAY DETAILED INFORMATION IF VARIABLE Y=1 | DISPLAY OPERATION : DISPLAY DETAILED INFORMATION IF VARIABLE Y=1 | DISPLAY OPERATION : DISPLAY DETAILED INFORMATION IF VARIABLE Y=1 | DISPLAY OPERATION : DISPLAY DETAILED INFORMATION IF VARIABLE Y=1 |

FIG. 6

| | |
|---|---|
| REMOTE CONTROLLER 113 IDENTIFICATION NUMBER=1 | NAVIGATION INFORMATION SEQUENCE 204 table_id_extension=0x0001 |
| REMOTE CONTROLLER 114 IDENTIFICATION NUMBER=0 | NAVIGATION INFORMATION SEQUENCE 203 table_id_extension=0x0000 |

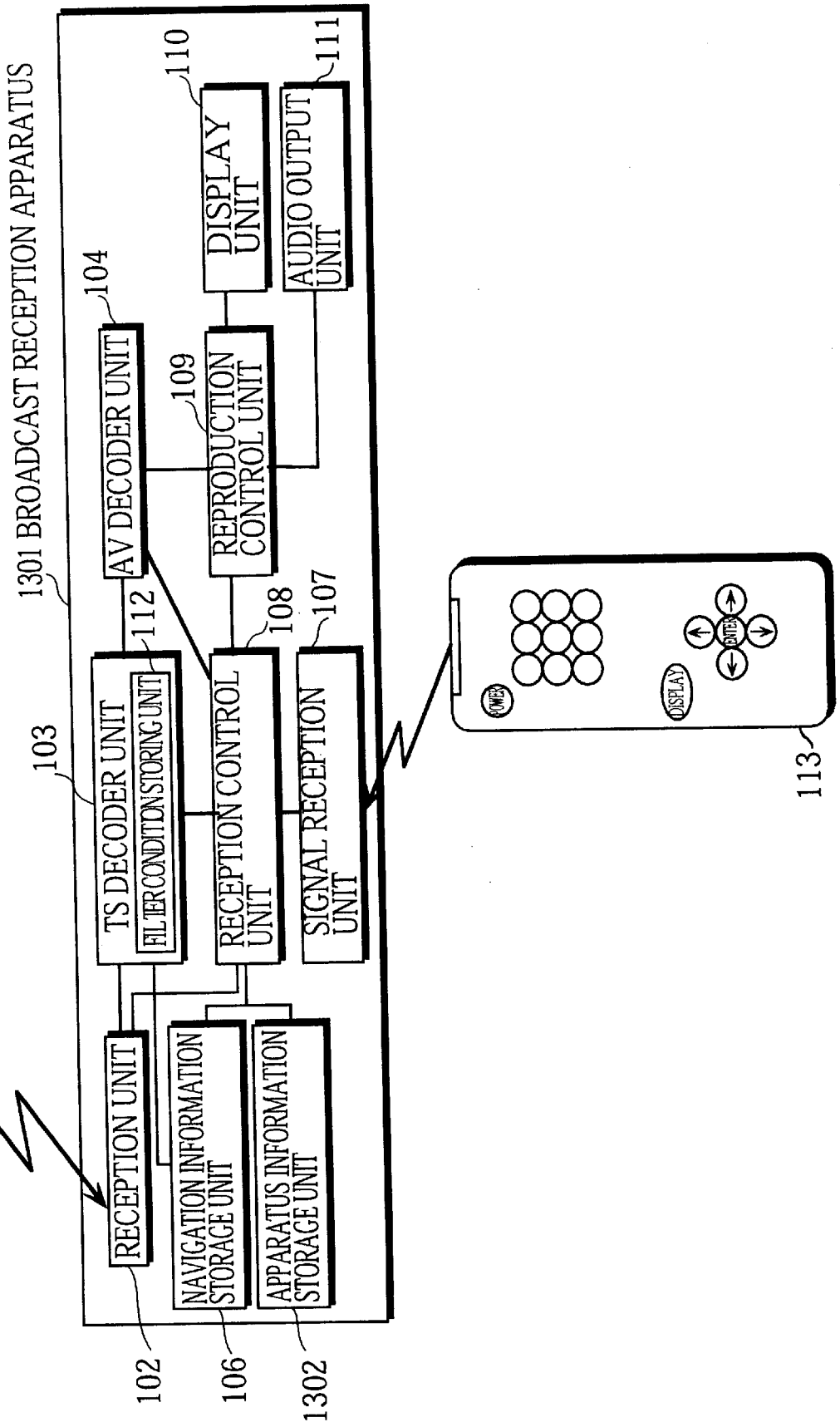

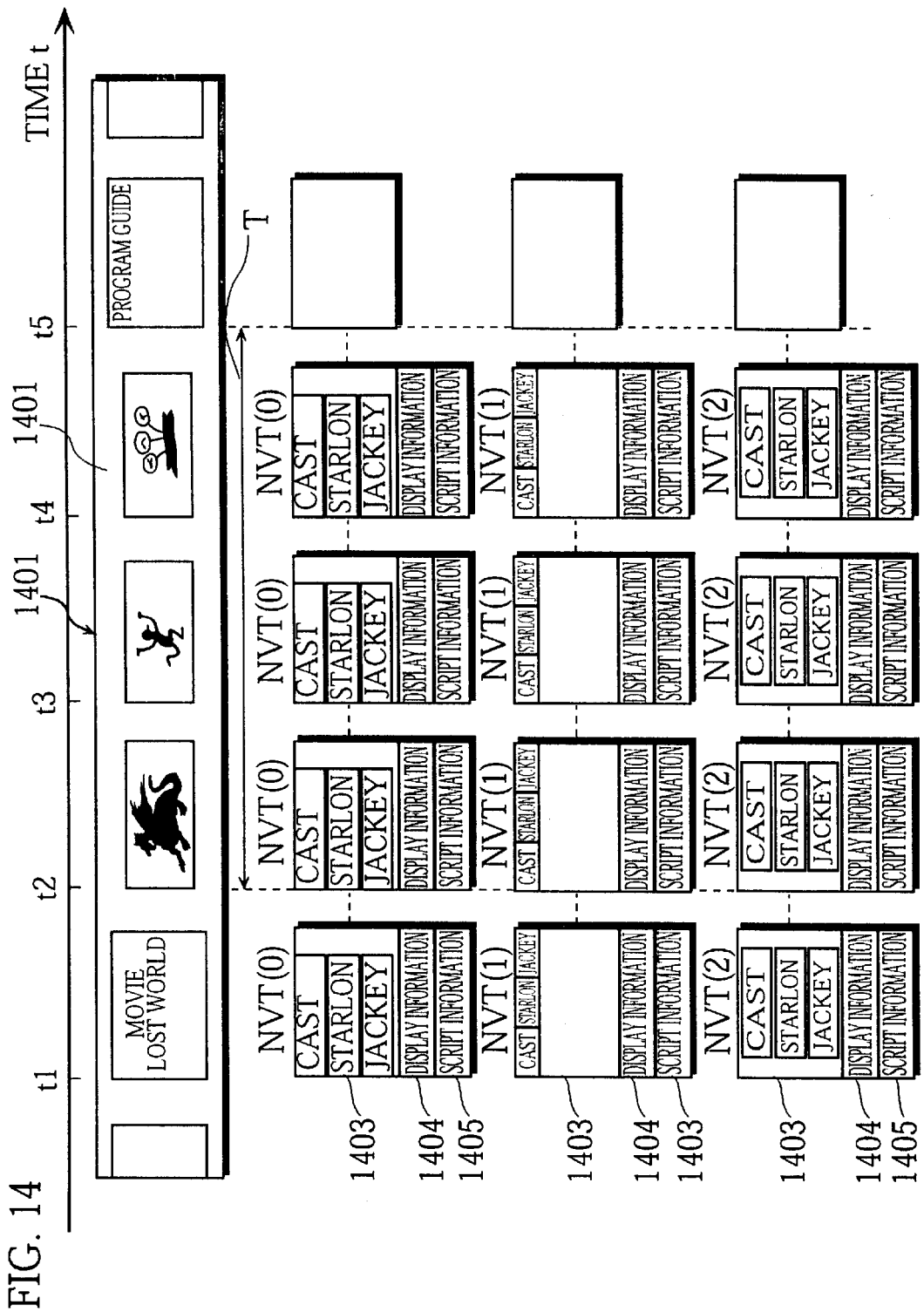

FIG. 15

| | SCRIPT INFORMATION |
|---|---|
| NVT(0) | ASPECT RATIO 4 : 3 ⇒ VARIABLE X=0 ;ASPECT RATIO 16 : 9 ⇒ VARIABLE X=1<br>COMBINATION OPERATION : VARIABLE X=0 ⇒ SUPERIMPOSING , VARIABLE X=1 ⇒ ALPHA BLENDING<br>DISPLAY OPERATION : VARIABLE X=0 ⇒ WHOLE TIME;VARIABLE X=1 ⇒ ONE OUT OF 10 SECONDS |
| NVT(1) | ASPECT RATIO 4 : 3 ⇒ VARIABLE X=0 ;ASPECT RATIO 16 : 9 ⇒ VARIABLE X=1<br>COMBINATION OPERATION : VARIABLE X=0 ⇒ ALPHA BLENDING; VARIABLE X=1 ⇒ SUPERIMPOSING<br>DISPLAY OPERATION : VARIABLE X=0 ⇒ ONE OUT OF 10 SECONDS;VARIABLE X=1 ⇒ WHOLE TIME |
| NVT(2) | ASPECT RATIO 4 : 3 ⇒ VARIABLE X=0 ;ASPECT RATIO 16 : 9 ⇒ VARIABLE X=1<br>COMBINATION OPERATION : VARIABLE X=0 ⇒ ALPHA BLENDING;VARIABLE X=1 ⇒ ALPHA BLENDING<br>DISPLAY OPERATION : VARIABLE X=0 ⇒ FIRST THREE SECONDS;VARIABLE X=1 ⇒ FIRST THREE SECONDS |

FIG. 17

| SCREEN TYPE | NAVIGATION INFORMATION |
|---|---|
| WIDE (ASPECT RATIO 16 : 9) | table_id_extension=0x0000 |
| NORMAL (ASPECT RATIO 4 : 3) | table_id_extension=0x0001 |
| SMALL-SCALE LCD | table_id_extension=0x0002 |

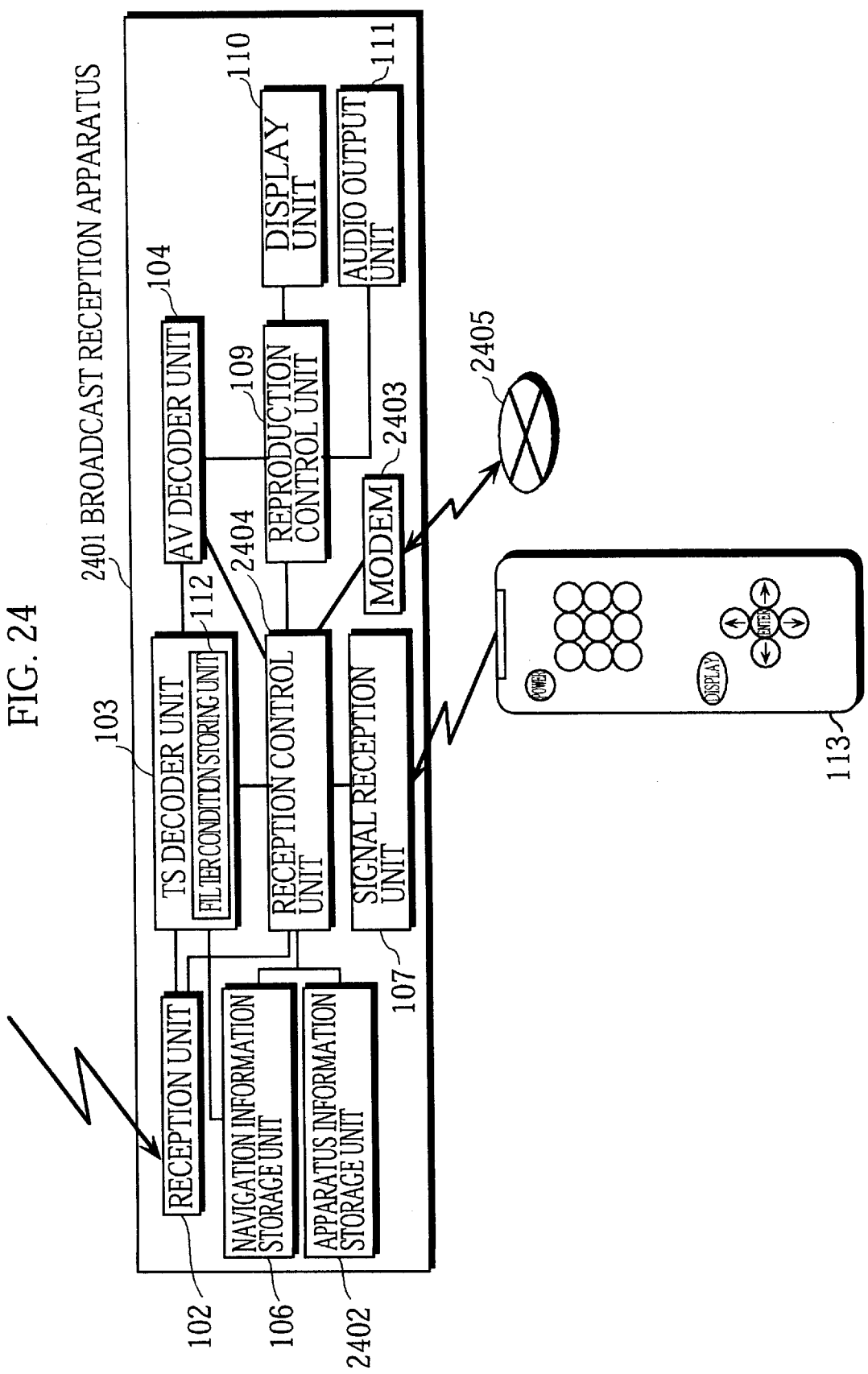

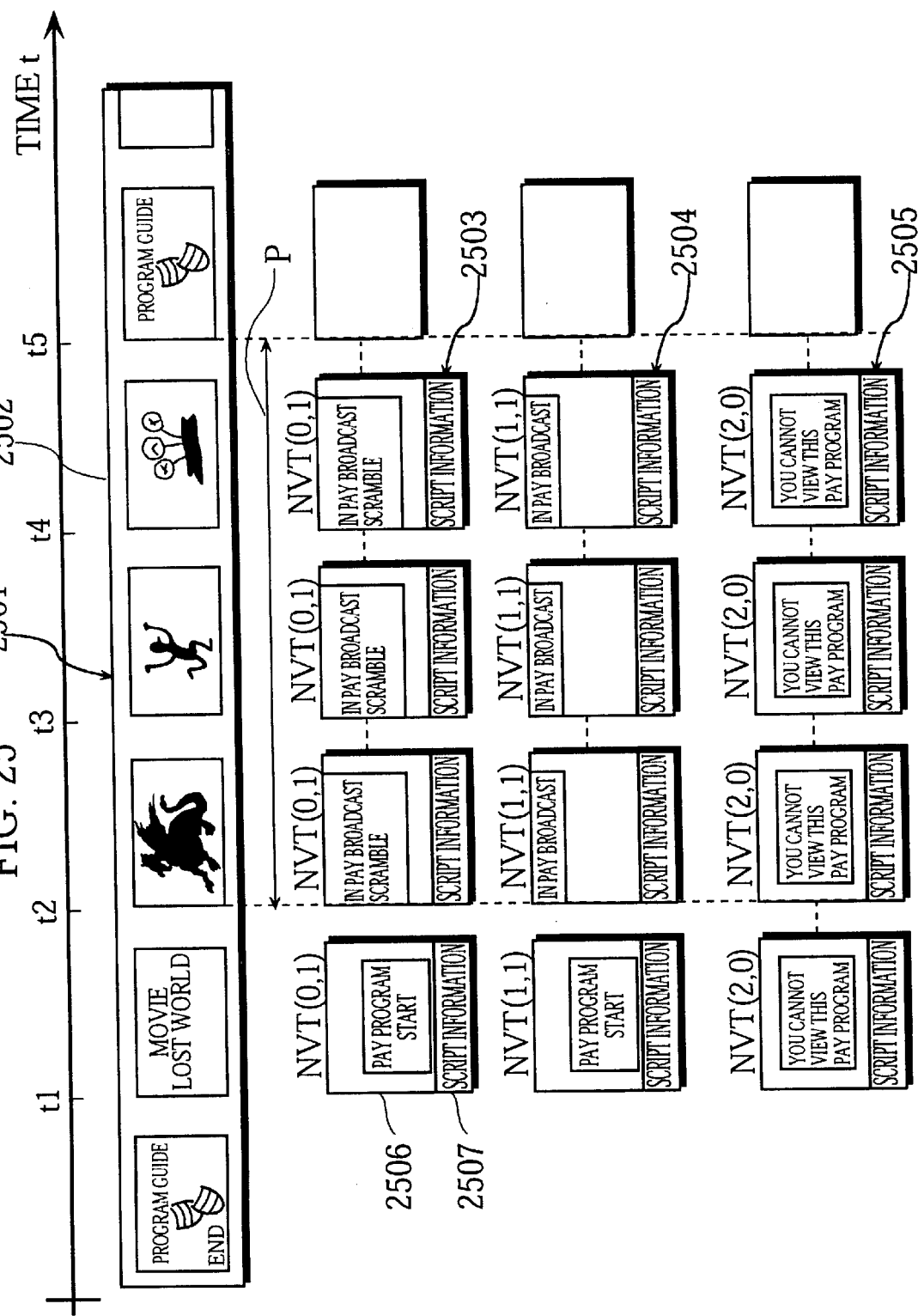

FIG. 26

| | SCRIPT INFORMATION |
|---|---|
| NVT(0, 0) | SET VARIABLE X TO INITIAL VALUE "2"<br>USER INPUT OPERATION : "ENTER" BUTTON FOR SELECTED PAY PROGRAM⇒VARIABLE X=0;<br>CHECK OPERATION : VARIABLE X=0⇒ASK PAY PROGRAM PROVIDER WHETHER THE USER IS AUTHORIZED TO VIEW<br>AUTHORIZED⇒VARIABLE X=1;UNAUTHORIZED⇒VARIABLE X=−1<br>DISPLAY OPERATION : X=2⇒SUPERIMPOSE GRAPHICS DATA ON IMAGE DATA AND DISPLAY<br>NAVIGATION INFORMATION UPDATE OPERATION : X=1⇒FETCH NVT(1,0)<br>X=−1⇒FETCH NVT(2,0) |
| NVT(0, 1) | SAME AS NVT(0,0) EXCEPT THE FOLLOWING:<br>NAVIGATION INFORMATION UPDATE OPERATION:X=1⇒FETCH NVT(1,1) X=−1⇒FETCH NVT(2,0) |
| NVT(1, 0) | DISPLAY OPERATION : X=1⇒SUPERIMPOSE GRAPHICS DATA ON IMAGE DATA AND DISPLAY |
| NVT(1, 1) | DISPLAY OPERATION : X=1⇒SUPERIMPOSE GRAPHICS DATA ON IMAGE DATA, DISPLAY FOR TWO SECONDS<br>TIMER OPERATION : ACTIVATE TIMER,SET X TO "−1" AFTER CERTAIN TIME<br>NAVIGATION INFORMATION UPDATE OPERATION : X=−1⇒FETCH NVT(2,0) |
| NVT(2, 0) | DISPLAY OPERATION : X=−1⇒SUPERIMPOSE GRAPHICS DATA ON IMAGE DATA AND DISPLAY |

FIG. 27

| ENTRY NAVIGATION INFORMATION | NVT(0,N) |
|---|---|
| TEL NO. FOR VARIABLE X=0 | 03−XXXX−YYYY |

FIG. 34

| Q1 : A | Q1 : DO YOU LIKE DRIVING?<br>1 YES     2 NO |
|---|---|
| Q1 : B | Q1 : DO YOU LIKE SHOPPING?<br>1 YES     2 NO |
| Q2 : C | Q2 : DO YOU HAVE DRIVER'S LICENCE?<br>3 YES     4 NO |
| Q2 : D | Q2 : DO YOUR FAMILY OWN A CAR?<br>3 YES     4 NO |
| Q3 : E | Q3 : HAVE YOU EVER BEEN TO OSAKA ?<br>5 YES     6 NO |
| Q3 : F | Q3 : HAVE YOU EVER BEEN TO TOKYO?<br>5 YES     6 NO |

FIG. 35

| | SCRIPT INFORMATION |
|---|---|
| NVT(0, 0) | SEX:MALE⇒VARIABLE X=1;FEMALE⇒VARIABLE X=2<br>AGE:LESS THAN 20⇒VARIABLE Y=3;20 OR MORE⇒VARIABLE Y=4<br>ADDRESS:KANTO DISTRICT⇒VARIABLE Z=5;KANSAI DISTRICT⇒VARIABLE Z=6<br>VARIABLE A1,A2,A3=0 |
| NVT(0, 1) | DISPLAY OPERATION:COMBINE GRAPHICS DATA OF NVT'S(0,1),(X),(Y),(Z) TOGETHER AND DISPLAY COMPOSITE IMAGE<br>INPUT OPERATION : "ENTER" BUTTON AT "1 YES"⇒VARIABLE A1=1;<br>    "ENTER" BUTTON AT "2 NO"⇒VARIABLE A1=2;<br>    "ENTER" BUTTON AT "3 YES"⇒VARIABLE A2=1;<br>    "ENTER" BUTTON AT "4 NO"⇒VARIABLE A2=2;<br>    "ENTER" BUTTON AT "5 YES"⇒VARIABLE A3=1;<br>    "ENTER" BUTTON AT "6 NO"⇒VARIABLE A3=2 |
| NVT(0, 2) | TRANSMIT X,Y,Z,A1,A2,A3 |

FIG. 40

NVT(0,2)                           4001

OBJECT DEFINITION TABLE :    4002

| INDEX | TYPE | X | Y | HANDLER | NORMAL BITMAP | FOCUSEDBITMAP |
|---|---|---|---|---|---|---|
| 0 | BUTTON | 100 | 200 | 2 | 6 | 7 |
| 1 | BUTTON | 100 | 250 | 4 | 8 | 9 |
| 2 | BUTTON | 100 | 300 | 5 | 10 | 11 |

HANDLER DEFINITION TABLE :
                                           4003

| INDEX | SCRIPT |
|---|---|
| 3 | x=-1;PlayAudio("BEEEEE") |
| 4 | x=1;PlayAudio("PingPong") |
| 5 | x=-1;PlayAudio("BEEEEE") |

BITMAP TABLE :

| INDEX | BITMAP DATA |
|---|---|
| 6 | 1.U.K. |
| 7 | 1.U.K. |
| 8 | 2.EGYPT |
| 9 | 2.EGYPT |
| 10 | 3.JAPAN |
| 11 | 3.JAPAN |

4004

BROADCAST RECEIVER SELECTIVELY USING NAVIGATION INFORMATION MULTIPLEXED ON TRANSPORT STREAM AND RECORDING MEDIUM RECORDING THE METHOD OF THE SAME

FIELD OF THE INVENTION

This invention relates to a user interface technique for a broadcast reception apparatus used in a TV broadcast system.

BACKGROUND OF THE INVENTION

Recently, satellite broadcast techniques have remarkably been developed. The Japanese Laid-Open Patent Application No. 5-284506, "Multimedia Selector for Satellite Broadcasts," discloses a technique for providing multimedia information being composed of images, voices, and digital data by superposing selectable pieces of digital data on an analog image signal. For example, it is possible with this technique to superimpose a subtitle on a broadcast image, the subtitle being one out of a plurality of languages selected by the user and being provided as digital data. This enables users of a broadcast system to select desired information among information transmitted to the users in one direction by the broadcast system. In other words, user interfaces are achieved as multimedia information transmission systems in which users can select desired information.

However, the above conventional technique discloses one video stream with one fixed user interface (digital data). Such a user interface may not be suited for all users. Also, it is impossible for program providers in the broadcast system to provide high-level, effective programs which are respectively arranged for different users since the system transmits only fixed user interfaces.

DISCLOSURE OF THE INVENTION

It is therefore an object of the present invention to provide a broadcast reception apparatus which can selectively use navigation information to achieve a user interface.

The above object is achieved by a broadcast reception apparatus for receiving broadcast data as a transport stream, where the transport stream includes video data and a plurality of navigation information sequences, each of the plurality of navigation information sequences includes navigation information which includes graphics data to be combined with the video data for display, the broadcast reception apparatus comprising: extracting unit for extracting the video data and navigation information from the transport stream; extract controlling unit for controlling the extracting unit so that the extracting unit extracts navigation information from one out of the plurality of navigation information sequences which is related to the broadcast reception apparatus; navigation information storage unit for storing the navigation information extracted by the extracting unit; and reproduction controlling unit for combining graphics data included in the navigation information stored in the navigation information storage unit with the video data extracted by the extracting unit and displaying a composite image which is a result of this combination.

The above broadcast reception apparatus may further comprise: operation receiving unit for receiving a user operation; and apparatus information storage unit for storing relationships between operation equipments and a plurality of identifiers of the plurality of navigation information sequences, the operation equipments being operated by a user to send user operations to the operation receiving unit, where the operation receiving unit includes: a signal receiving unit for receiving a signal which specifies one out of the operation equipments which is used for the user operation received by the operation receiving unit, and the extract controlling unit includes: an extract condition setting unit for obtaining from the apparatus information storage unit an identifier of a navigation information sequence which corresponds to the operation equipment specified by the signal received by the signal receiving unit and setting a condition for extracting navigation information in the extracting unit.

With the above construction, it is possible for the broadcast reception apparatus to obtain the navigation information which includes graphics data suitable for the user since the user type can be identified from the operation equipment used by the user, achieving a user interface in the display image.

In the above broadcast reception apparatus, each of the plurality of navigation information sequences may include a plurality of sets of pieces of navigation information, the plurality of sets of pieces of navigation information corresponding to respective time periods, and each set of pieces of navigation information being formed by repeatedly multiplexing a piece of navigation information during a corresponding time period, and where the extract condition setting unit sets a condition for extracting navigation information in accordance with a time period.

With such a construction, it is possible to reliably achieve a user interface related to the display image.

In the above broadcast reception apparatus, the operation equipments may be a remote controller for adults and a remote controller for children, and the plurality of navigation information sequences may be a navigation information sequence for adults and a navigation information sequence for children.

With the above construction, it is possible to achieve an optimal user interface since graphics data for adults or children is read from the corresponding navigation information sequences and is superimposed on the video image.

In the above broadcast reception apparatus, each piece of navigation information may include display position information and time information, the display position information indicating a position for displaying graphics data, the time information indicating a time period during which graphics data is displayed, where the reproduction controlling unit combines graphics data with the video data in accordance with the display position information and displays a composite image in accordance with the time information.

With such a construction, it is possible to achieve a user interface with a composite image. In the composite image, the graphics data is superimposed on the video data at an appropriate position and is displayed for an appropriate period, the position and period being determined in accordance with the video data.

The above broadcast reception apparatus may further comprise: apparatus information storage unit for storing relationships between display screens and a plurality of identifiers of the plurality of navigation information sequences, the display screens displaying the composite image combined by the reproduction controlling unit, where the extract controlling unit includes: an extract condition setting unit for receiving information indicating one out of the display screens from the reproduction controlling unit, obtaining from the apparatus information storage unit an identifier of a navigation information sequence which corresponds to the display screen indicated by the information received from the reproduction controlling unit, and setting a condition for extracting navigation information in the extracting unit.

With such a construction, it is possible to extract navigation information suitable for a display screen type to achieve a user interface.

In the above broadcast reception apparatus, the display screens may include a wide screen with aspect ratio 16:9, a normal screen with aspect ratio 4:3, and a small-scale LCD (Liquid Crystal Display), navigation information corresponding to the wide screen includes display position information which indicates a position for displaying graphics data, the position being a right-hand side and a left-hand side blank areas generated when a normal-size image is displayed on the wide screen, navigation information corresponding to the normal screen includes display position information which indicates a position for displaying graphics data, the position being a top and bottom blank areas generated when a wide-size image is displayed on the normal screen, and navigation information corresponding to the small scale LCD includes display position information which indicates a position for displaying graphics data, the position being almost a whole display area, the extract controlling unit includes: a size receiving unit for receiving image size information specifying either of a wide size and a normal size concerning an image of the video data; and a display instructing unit for instructing the reproduction controlling unit to display the graphics data on a display screen at a position indicated by the display position information in accordance with the information indicating one out of the display screens received from the reproduction controlling unit and in accordance with the image size information received by the size receiving unit.

With the above construction, it is possible to achieve a user interface suitable for the display unit since: graphics data is displayed on a right-hand side and a left-hand side blank areas on the wide screen if the image has the normal size; graphics data is displayed on a top and bottom blank areas on the normal screen if the image has the wide size; and graphics data is displayed on almost a whole display area of the small-scale LCD.

The above broadcast reception apparatus may further comprise: operation receiving unit for receiving a user operation; a modem connected to a public network; and apparatus information storage unit for storing a telephone number of a connection destination to which the modem is connected, where the extract controlling unit includes: an authority checking unit for reading the telephone number, connecting to the connection destination by the modem, and checking whether a pay broadcast program is to be viewed when the extracting unit extracts video data of the pay broadcast program and the operation receiving unit receives a user operation indicating that the user selects the pay broadcast program; a first extract condition setting unit, when the authority checking unit receives a confirmation that the pay broadcast program is to be viewed, for setting a condition in the extracting unit for extracting navigation information included in a navigation information sequence related to the confirmation that the pay broadcast program is to be viewed; and a second extract condition setting unit, when the authority checking unit receives an answer that the pay broadcast program is not to be viewed, for setting a condition in the extracting unit for extracting navigation information included in a navigation information sequence related to the answer that the pay broadcast program is not to be viewed.

With such a construction, it is possible to provide a user interface which appropriately shows the user that the selected program is a pay broadcast program and whether the user is authorized to view the program.

In the above broadcast reception apparatus, the authority checking unit may receive information of a permitted audience time period together with the confirmation that the pay broadcast program is to be viewed, the extract controlling unit includes: a timer unit for activating the second extract condition setting unit when the permitted audience time period has expired.

With such a construction, it is possible to inform the user of unavailability of the program when the permitted audience time period has expired.

The above object is also achieved by a broadcast reception apparatus for receiving broadcast data as a transport stream, where the transport stream includes video data and a plurality of pieces of navigation information which includes graphics data to be combined with the video data for display, the broadcast reception apparatus comprising: operation receiving unit for receiving a user operation; extracting unit for extracting the video data and navigation information from the transport stream;

extract controlling unit for controlling the extracting unit so that the extracting unit extracts two or more pieces of navigation information out of the plurality of pieces of navigation information in accordance with the user operation received by the operation receiving unit; navigation information storage unit for storing the two or more pieces of navigation information extracted by the extracting unit; and reproduction controlling unit for combining graphics data included in the two or more navigation information stored in the navigation information storage unit with the video data extracted by the extracting unit and displaying a composite image which is a result of this combination.

With the above construction, it is possible to extract as many pieces of navigation information as necessary from a plurality of pieces of navigation information in accordance with the user operation and combine the graphics data of the extracted pieces of navigation information with the video data to achieve a user interface. In addition, the capacity of a storage unit storing the navigation information may be reduced since only necessary pieces of navigation information are stored in the storage unit.

In the above broadcast reception apparatus, the user operation received by the operation receiving unit may be a user attribute, and each of the plurality of pieces of navigation information may include graphics data corresponding to a user attribute.

With such a construction, it is possible for the user to selectably use navigation information which is suitable for the user.

The above broadcast reception apparatus may further comprise: a modem connected to a public network; apparatus information storage unit for storing a telephone number of a connection destination to which the modem is connected; and transmitting unit for transmitting data to the connection destination by the modem, the data corresponding to a response by a user to the graphics data displayed by the reproduction controlling unit.

With the above construction, it is possible to perform a research by unit of questionnaires using display images as a user interface.

The above object is also achieved by a record medium to be used for a broadcast reception apparatus, where the broadcast reception apparatus receives broadcast data as a transport stream, the transport stream includes video data and a plurality of navigation information sequences, each of the plurality of navigation information sequences includes navigation information which includes graphics data to be combined with the video data for display, the broadcast reception apparatus comprises: an extracting unit for extracting the video data and navigation information from the transport stream; and a navigation information storage unit for storing the navigation information extracted by the extracting unit, a program is recorded in the record medium, the program includes: an extract controlling step for controlling the extracting unit so that the extracting unit extracts navigation information from one out of the plurality of navigation information sequences which is related to the broadcast reception apparatus; and a reproduction controlling step for combining graphics data included in the navigation information stored in the navigation information storage unit with the video data extracted by the extracting unit and displaying a composite image which is a result of this combination.

With the above construction, the record medium is used in a broadcast reception apparatus not having originally a function of selecting desired navigation information so that the broadcast reception apparatus can selectively use navigation information suitable for the apparatus to achieve a user interface.

The above object is also achieved by a record medium to be used for a broadcast reception apparatus, where the broadcast reception apparatus receives broadcast data as a transport stream, where the transport stream includes video data and a plurality of pieces of navigation information which includes graphics data to be combined with the video data for display, the broadcast reception apparatus comprises: an extracting unit for extracting the video data and navigation information from the transport stream; and a navigation information storage unit for storing two or more pieces of navigation information extracted by the extracting unit, a program is recorded in the record medium, the program includes: a determining step for determining a user operation; an extract controlling unit for controlling the extracting unit so that the extracting unit extracts the two or more pieces of navigation information out of the plurality of pieces of navigation information in accordance with the user operation determined in the determining step; a combining step for combining together two or more pieces of graphics data included in the two or more navigation information stored in the navigation information storage unit; and a combination displaying step for combining the graphics data combined in the combining step with the video data extracted by the extracting unit and displaying a composite image which is a result of this combination.

With the above construction, it is possible for a broadcast reception apparatus to extract as many pieces of navigation information as necessary to combine their graphics data with the video data and achieve a user interface by loading the above record medium even if the broadcast reception apparatus does not have this function.

BRIEF DESCRIPTION OF THE DRAWINGS

FIG. 3 shows the script information included in the navigation information of Embodiment 1.

FIG. 6 shows contents of the apparatus information storage unit of Embodiment 1.

FIG. 13 is a block diagram showing the construction of Embodiment 2 of the present invention, a broadcast reception apparatus.

FIG. 14 shows the contents of the transport streams received by the reception unit of Embodiment 2.

FIG. 15 shows the script information included in the navigation information of Embodiment 2.

FIG. 17 shows contents of the apparatus information storage unit of Embodiment 2.

FIG. 24 is a block diagram showing the construction of Embodiment 3 of the present invention, a broadcast reception apparatus.

FIG. 25 shows the contents of the transport streams received by the reception unit of Embodiment 3.

FIG. 26 shows the script information included in the navigation information of Embodiment 3.

FIG. 27 shows contents of the apparatus information storage unit of Embodiment 3.

FIG. 34 shows the contents of the graphics data included in the navigation information shown in FIG. 33.

FIG. 35 shows the script information included in the navigation information shown in FIG. 33.

FIG. 40 shows navigation information table NVT (0,2) which has the same contents as navigation information NVT (0,2) of Embodiment 1.

DESCRIPTION OF THE PREFERRED EMBODIMENTS

Preferred embodiments of the present invention, a broadcast reception apparatus, are described below with reference to drawings.

Embodiment 1

Figure 1:
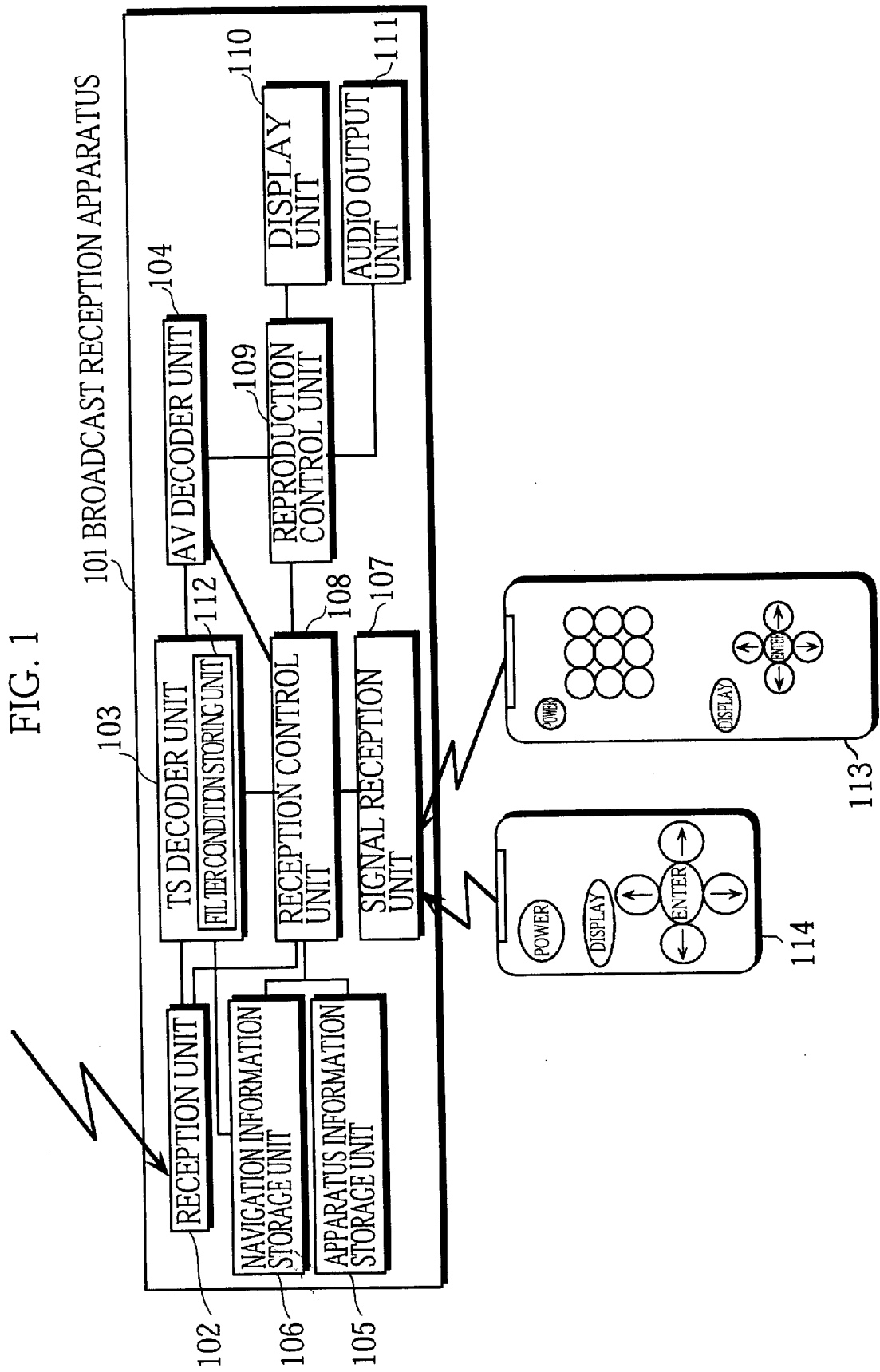
FIG. 1 is a block diagram showing the construction of Embodiment 1 of the present invention, a broadcast reception apparatus.

FIG. 1 is a block diagram showing the construction of Embodiment 1 of the present invention, a broadcast reception apparatus.

A broadcast reception apparatus 101 is composed of a reception unit 102, a TS (Transport Stream) decoder unit 103, an AV decoder unit 104, an apparatus information storage unit 105, a navigation information storage unit 106, a signal reception unit 107, a reception control unit 108, a reproduction control unit 109, a display unit 110, and an audio output unit 111. With the above construction, the broadcast reception apparatus 101 selects a program (event) from a transport stream by using navigation information for each user, the transport stream being broadcast data transmitted from a broadcast apparatus (not shown in the drawings).

Note that the transport stream is broadcast data multiplied by an MPEG (Moving Picture Experts Group2) system. The transport stream includes video streams and navigation information as described later. The navigation information includes graphics data which is superimposed on the image of broadcast data to interface with the user. The navigation information also includes script information for securing an interactive communication with the user.

The TS decoder unit 103 includes a filter condition storing unit 112. The signal reception unit 107 receives user operation signals from remote controllers 113 and 114 being external apparatuses.

The reception unit 102 receives transport streams specified by the reception control unit 108 and outputs the received transport streams to the TS decoder unit 103.

Figure 2:
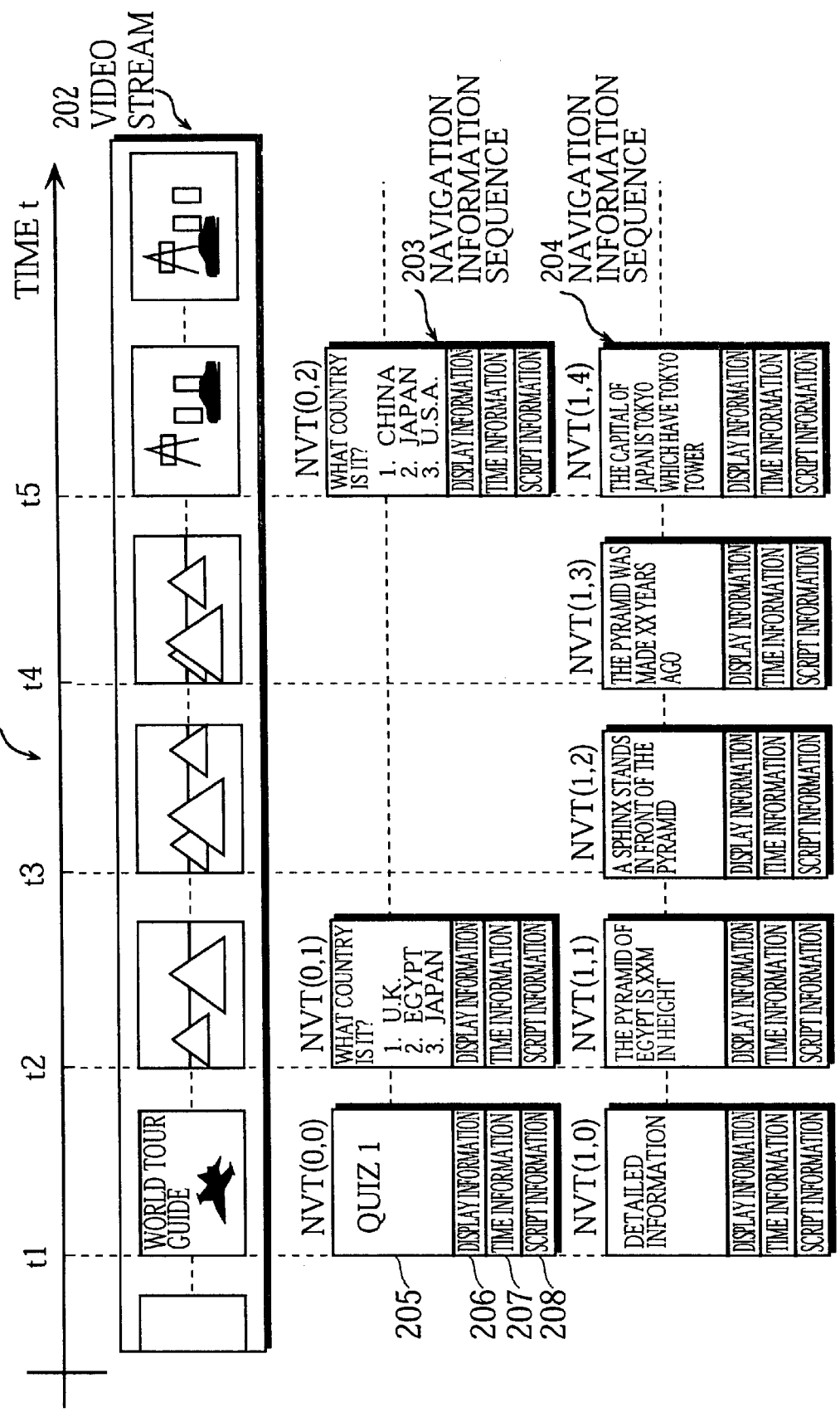
FIG. 2 shows the contents of the transport streams received by the reception unit of Embodiment 1.

FIG. 2 shows the contents of the transport streams received by the reception unit 102.

A transport stream 201 includes a video stream 202 and navigation information sequences 203 and 204. The video stream 202 is video data of a world tour guide; the navigation information sequences 203 and 204 are used as user interfaces during reproduction of the video stream 202. The video stream 202 and either of the navigation information sequences 203 and 204 make up an event.

The navigation information sequence 203 is a user interface for children and includes quizzes which are superimposed on the reproduction image of the video stream 202. The navigation information sequence 204 is a user interface for adults and includes detailed information which is superimposed on the reproduction image of the video stream 202. The navigation information sequences 203 and 204 includes a variety of contents corresponding to scenes in the reproduction image.

The navigation information sequence 203 has three versions: NVT (0,0), NVT (0,1), and NVT (0,2); the navigation information sequence 204 has five versions: NVT (1,0), NVT (1,1), NVT (1,2), NVT (1,3), and NVT (1,4).

Each piece of navigation information includes graphics data 205, display information 206, time information 207, and script information 208. The graphics data 205 is superimposed on the reproduction image; display information 206 specifies a display position and a display frame of the graphics data 205; time information 207 shows a display effective time for each version; and script information 208 shows an output operation and a display operation to be performed according to a user operation. For example, NVT (0,0) of the navigation information sequence 203 has a display effective time for a period between time t1 and time t2.

FIG. 3 shows a variety of pieces of script information 208 included in respective pieces of navigation information which are further included in either of navigation information sequences 203 and 204. For example, NVT (0,1) of the navigation information sequence 203 specifies that a composite tone of a chime indicating "correct" is output when the user depresses the ENTER button while "2. EGYPT" is focused on the display screen.

NVT (1,N) of the navigation information sequence 204 specifies that "detailed information" is displayed on the screen when variable Y is "1." The detailed information is graphics data as described above. Note that the script for a display operation is omitted in NVT (0,N).

Figure 4:
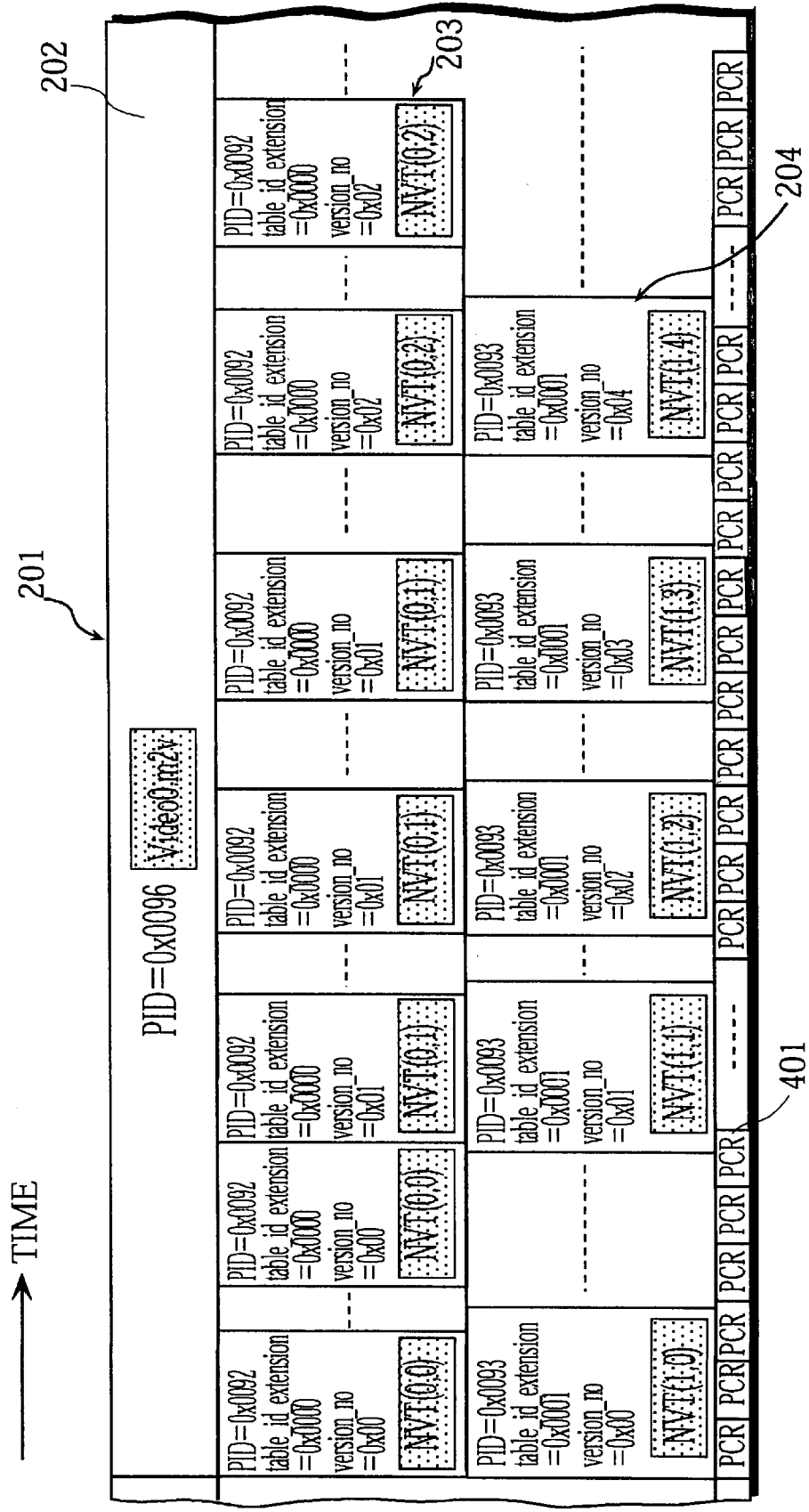
FIG. 4 shows a transport stream of Embodiment 1.

FIG. 4 shows the transport stream 201 transmitted from a broadcast station. As shown in the drawing, each of the video stream 202 and the navigation information sequences 203 and 204 has its identification information so that the TS decoder unit 103 can separate them from the transport stream 201.

The video stream 202 has an MPEG-2 compliant identifier PID. The navigation information sequences 203 and 204 have an MPEG-2 compliant identifier PID, a table identification extension (table_id_extension), and a version number (version_no).

The transport stream 201 also includes multiplexed PCRs (Program Clock Reference) 401 used for managing the reproduction time. Each version of the navigation information sequences 203 and 204 is repeatedly transmitted during the specified display effective time.

The transport stream 201 includes other multiplexed system information such as PMT (Program Map Table) stipulated in MPEG2 or DVB (Digital Video Broadcasting). The system information is not described in the present document since it is not relevant to the present invention. Techniques for multiplexing the transport stream are described in "Sogo Maruchimedia Sensho MPEG (Selected Book on Multimedia: MPEG), edited by the Television Society, Ohm Inc., 1994.

The TS decoder unit 103 includes the filter condition storing unit 112 for storing a filter condition set by the reception control unit 108. The TS decoder unit 103, according to the set filter condition, separates a video stream, navigation information, and PCRs from the transport stream output from the reception unit 102. The TS decoder unit 103 outputs the separated video stream to the AV decoder unit 104, writes the separated navigation information into the navigation information storage unit 106, and outputs the separated PCRs to the AV decoder unit 104.

The filter condition storing unit 112 stores a plurality of filter conditions. The TS decoder unit 103 performs a plurality of separation processes in parallel based on the plurality of filter conditions.

The TS decoder unit 103 separates the video stream from the transport stream and outputs it to the AV decoder unit 104 when the reception control unit 108 stores PID "0x0096" in the filter condition storing unit 112 as a filter condition.

The TS decoder unit 103 fetches NVT (0,N), which corresponds to one of the versions currently transmitted by repetition, and stores it in the navigation information storage unit 106 when the reception control unit 108 stores PID "0x0092" and table_id_extension "0x0000" in the filter condition storing unit 112. The TS decoder unit 103 then fetches NVT (0,n+1) and stores it in the navigation information storage unit 106 when the reception control unit 108 stores version_no "0x0(n+1)" in the filter condition storing unit 112 as a filter condition, with the PID and table_id_extension kept unchanged.

The TS decoder unit 103 fetches NVT (1,N), which is currently transmitted repeatedly, and stores it in the navigation information storage unit 106 when the reception control unit 108 stores PID "0x0093" and table_id_extension "0x0001" in the filter condition storing unit 112. The TS decoder unit 103 then fetches NVT (1,n+1) and stores it in the navigation information storage unit 106 when the reception control unit 108 stores version_no "0x0(n+1)" in the filter condition storing unit 112 as a filter condition.

The AV decoder unit 104 includes a clock unit which is not shown in the drawings. The AV decoder unit 104, in synchronization with the clock unit and in compliance with MPEG2, decodes the video stream 202 output from the TS decoder unit 103 and outputs the decoded video stream to the reproduction control unit 109. The clock unit is set to a correct standard time based on the PCRs output from the TS decoder unit 103 and counts a standard time to synchronize with the decoding of the video stream 202.

The apparatus information storage unit 105 stores relationships between operations by the user on an external unit and the navigation information sequences 203 and 204, the external unit being used to transmit signals to the signal reception unit 107 of the broadcast reception apparatus 101.

Figure 5:
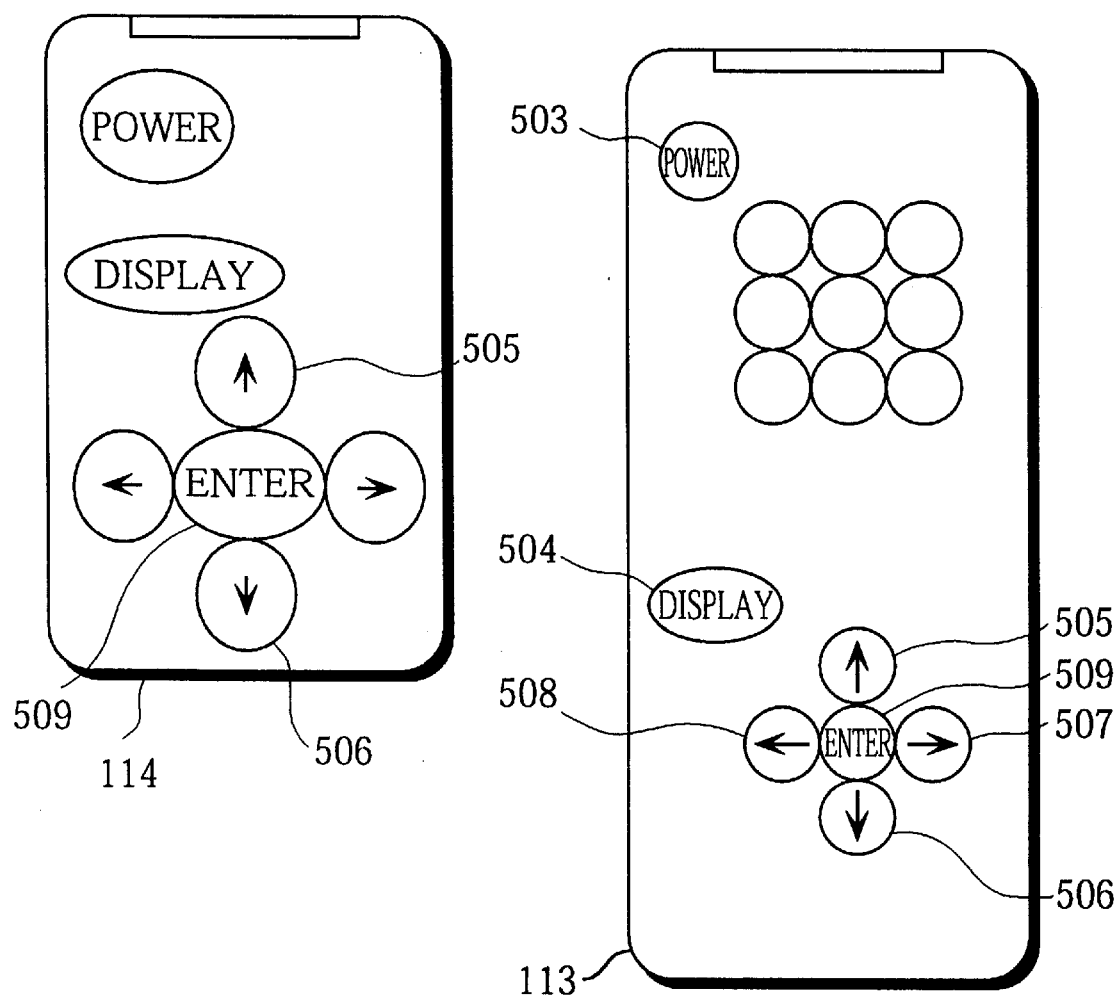
FIG. 5 shows remote controllers used in Embodiment 1 as external units.

FIG. 5 shows appearances of remote controllers 113 and 114, samples of the external unit. The remote controller 113 is intended for use by adults, and Chinese characters can be written on the buttons. The remote controller 114 is intended for use by children and the buttons can be written with Hiragana (a Japanese character) so that children can read. Both remote controllers 113 and 114 have a power key 503, a screen display key 504, a "↑" key 505, a "↓" key 506, a "→" key 507, a "←" key 508, an enter key 509.

FIG. 6 shows relationships between the remote controllers 113 and 114 and the navigation information sequences 203 and 204.

The drawing shows that the navigation information sequence 204 is selectively separated from the transport stream when the remote controller 113 is operated by the user; the navigation information sequence 203 is selectively separated from the transport stream when the remote controller 114 is operated.

The signal reception unit 107 receives a user operation signal from either of the remote controllers 113 and 114 and outputs the received signal to the reception control unit 108. For example, the signal reception unit 107 receives a signal specifying an event selected by the user from events included in the transport stream transmitted from a broadcast station, then outputs the received signal to the reception control unit 108. In doing this, the signal reception unit 107 also sends an identification number of remote controller 113 or 114 to the reception control unit 108 together with the signal specifying the event. The signal reception unit 107 receives a "↑" signal, a "↓" signal, and an enter signal, which are described later, and outputs the received signals to the reception control unit 108. When the user presses the "↑" key 505, "↓" key 506, or enter key 509, the remote controller 113 transmits a signal corresponding to the pressed key to the signal reception unit 107. The "Θ" key 505 and the "1" key 506 are used to change the number in focus on the display unit 110 upward and downward respectively. The enter key 509 is used to determine to enter a number or a button in focus.

On receiving an event selection signal input by the user and transferred from the signal reception unit 107, the reception control unit 108 stores PID "0x0096" in the filter condition storing unit 112 as a filter condition. On receiving an identification number of a remote controller from the signal reception unit 107, the reception control unit 108 refers to the apparatus information storage unit 105 for the relationships between the remote controller and the navigation information sequences, and stores a filter condition of the navigation information in the filter condition storing unit 112.

When the user uses the remote controller 113, the reception control unit 108 receives identification number "1" from the signal reception unit 107, reads table_id_extension "0x0001" from the apparatus information storage unit 105, stores PID "0x0093" and table_id_extension "0x0001" in the filter condition storing unit 112 as a filter condition. Note that the reception control unit 108 detects the PID value from table_id_extension by referring to system information which has not been described.

When the navigation information storage unit 106 stores NVT (1,0), for example, the reception control unit 108 reads the time information 207 corresponding to the NVT (1,0), refers to the clock unit in the AV decoder unit 104, stores the next version_no "0x01" of the navigation information sequence 204 in the filter condition storing unit 112, with the PID and table_id_extension unchanged, when the display effective time comes to an end, reaching time t2.

On receiving the enter signal from the signal reception unit 107 while the navigation information storage unit 106 stores NVT (1,0), the reception control unit 108 sets variable Y to "1."

The reception control unit 108 sends a display instruction to the reproduction control unit 109 according to the display operation specified in the script information as the NVT changes to (1,1), (1,2), (1,3), or (1,4).

The reception control unit 108 reads the graphics data 205 and the display information 206 from the navigation information storage unit 106 and sends them to the reproduction control unit 109.

On receiving the enter signal from the signal reception unit 107 while the navigation information storage unit 106 stores NVT (0,1) or (0,2), the reception control unit 108 sets variable X to "−1" according to the script information if the number in focus set by the reproduction control unit 109 is "1" (representing U.K.) or "3" (representing Japan); the reception control unit 108 sets variable X to "1" if the number in focus is "2" (representing Egypt).

The reception control unit 108 instructs the reproduction control unit 109 to output a buzzer for variable X "1" and a chime for variable X "1," then sets variable X to "0."

The reproduction control unit 109, according to an instruction from the reception control unit 108, generates an image signal by combining image data decoded by the AV decoder unit 104 with graphics data output from the reception control unit 108, and outputs the generated image signal to the display unit 110. The reproduction control unit 109 also generates composite tone based on an interpretation of the script sent from the reception control unit 108 and outputs the composite tone to the audio output unit 111. Simultaneously, graphics data is superimposed on the image data at a display position corresponding to a position in a display frame of the display screen.

The display unit 110, achieved by a CRT, an LCD (Liquid Crystal Display) or the like, displays images received from the reproduction control unit 109.

The audio output unit 111, achieved by a speaker or the like, outputs sounds received from the reproduction control unit 109.

Figure 7:
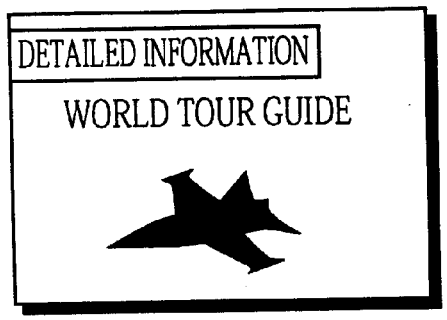
FIG. 7 shows an image displayed on the display unit of Embodiment 1.
Figure 8:
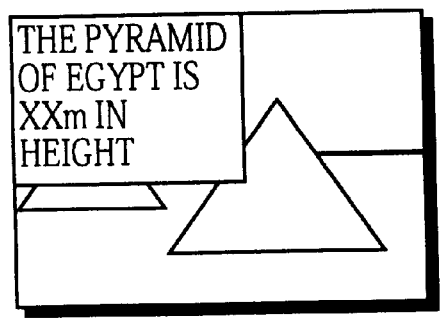
FIG. 8 shows an image displayed on the display unit of Embodiment 1.

The following is a description of specific display operations on the display unit 110. The TS decoder unit 103 separates the video stream 202 from the transport stream and outputs it to the AV decoder unit 104 when the user selects an event in the transport stream 201 using the remote controller 113 during a period between time t1 and time t2. On receiving the graphics data and the display information, which are user interfaces for adults, corresponding to NVT (1,0) from the reception control unit 108, the reproduction control unit 109 superimposes the graphics data on the image data decoded by the AV decoder unit 104 at a display position in a display frame specified by the display information, then outputs the composite image to the display unit 110. FIG. 7 shows an image displayed on the display unit 110 as a result of the above operation. The reproduction control unit 109 specifies an area on the display unit 110 displaying graphics data "detailed information" as a default area in focus. When the user presses the enter key 509 on the remote controller 113 under the condition, the TS decoder unit 103 fetches NVT (1,1) at time t2 and stores it in the navigation information storage unit 106. FIG. 8 shows an image displayed on the display unit 110 as a result of this operation.

Figure 9:
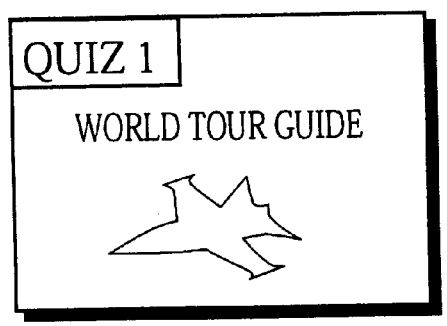
FIG. 9 shows an image displayed on the display unit of Embodiment 1.
Figure 10:
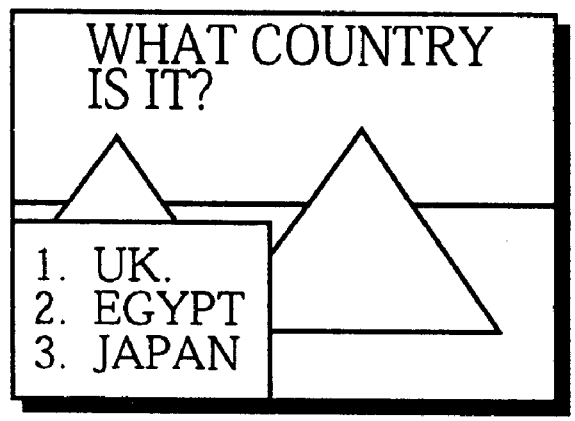
FIG. 10 shows an image displayed on the display unit of Embodiment 1.

FIG. 9 shows an image displayed on the display unit 110 when the user selects an event using the remote controller 114 during the period between time t1 and time t2. When the user presses the enter key 509 under the condition, the display unit 110 shows displays an image as shown in FIG. 10. The reproduction control unit 109 specifies number "1" for U.K. as a default area in focus. When the user presses the "↓" key 506 once on the remote controller 114, the reproduction control unit 109 receives the "↓" signal from the reception control unit 108 and slides the state in focus to number "2" for Egypt. The reproduction control unit 109 also receives an instruction to output composite tone of a chime and instructs the audio output unit 111 to output the composite tone of chime.

Figure 11:
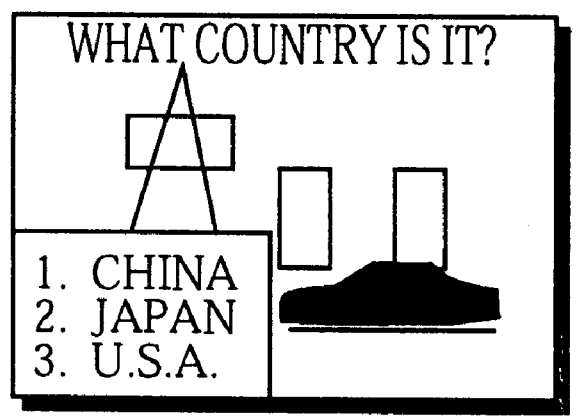
FIG. 11 shows an image displayed on the display unit of Embodiment 1.

The displayed image changes to the one shown in FIG. 11 after time t5. The default in-focus area is number "1" for China. When the user presses the enter key on the remote controller 114, the audio output unit 111 outputs composite tone of a buzzer.

Figure 12:
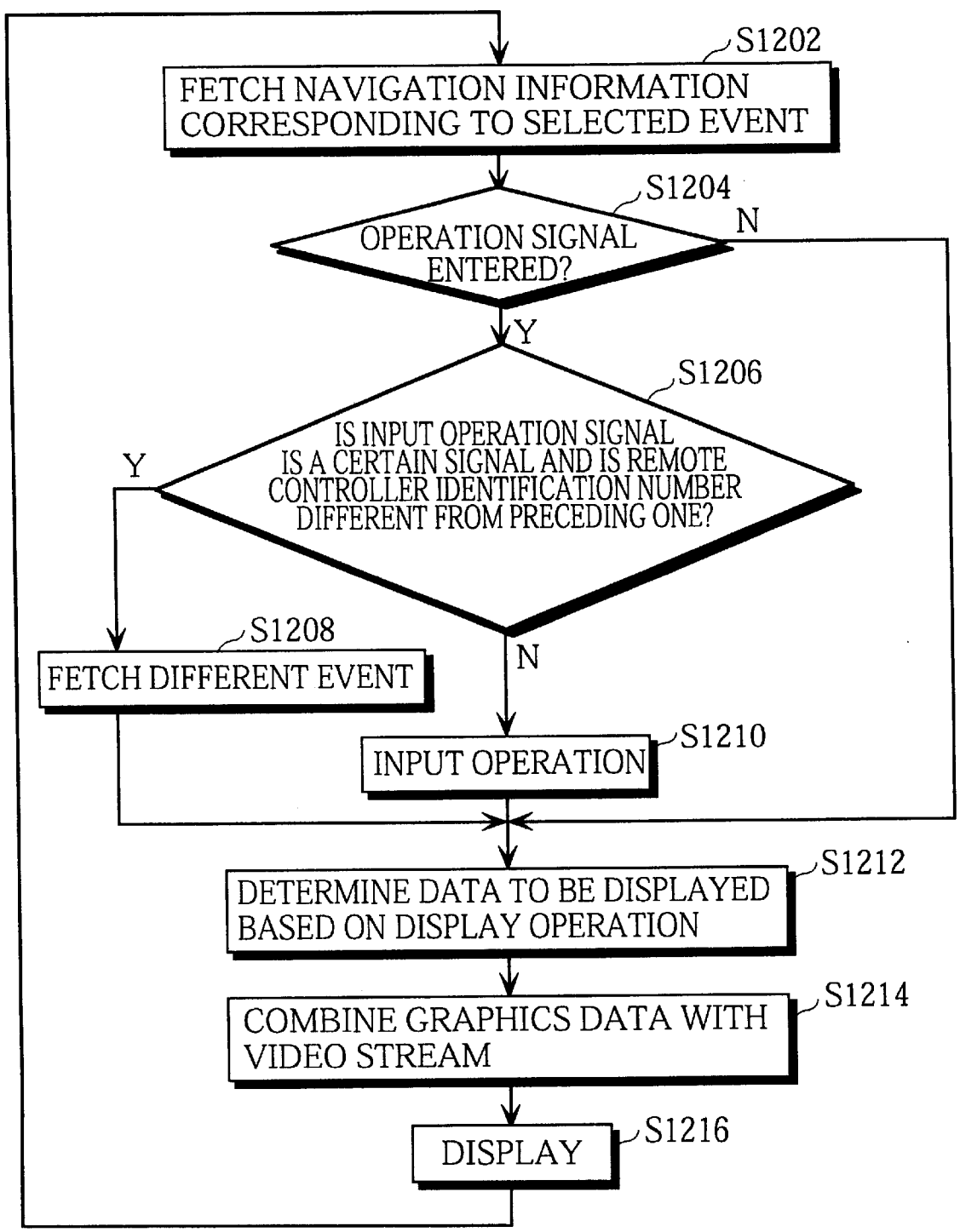
FIG. 12 is a flowchart showing the operation of Embodiment 1.

Now, the operation of the present embodiment is described with reference to the flowchart shown in FIG. 12.

The TS decoder unit 103 separates video stream 202 from the transport stream, fetches navigation information corresponding to an operation by the user to select an event on the remote controller, and stores the fetched navigation information in the navigation information storage unit 106 (step S1202). The reception control unit 108 judges whether an operation signal has been entered by the user (S1204). If no operation signal has been entered, control goes to S1212. If an operation signal has been entered, it is judged in step S1206 whether the input operation signal is one of certain signals such as the enter signal, "↑" signal, and "↓" signal respectively corresponding to the enter key 509, "↑" key 505, and "↓" key 506 and whether the remote controller identification number of the operation signal is different from that of the preceding signal. When the identification number is different, an event (navigation information) different from the current one is fetched (S1208). When the identification number is not different, variable X or Y is set to a certain value according to the script information in the navigation information reflecting the input operation (S1210), then control moves to step S1212.

In step S1212, the reception control unit 108 determines the data to be displayed based on the value set as variable X or Y: the reception control unit 108 determines that the detailed information of the navigation information sequence 204 should be displayed by referring to the display operation in the script information when variable Y is "1"; the reception control unit 108 determines that the graphics data of the navigation information sequence 203 should be displayed when variable X is "0."

The reproduction control unit 109 combines the image data of the video stream with the graphics data in the navigation information (S1214). The display unit 110 displays the composite image. At the same time, the audio output unit 111 outputs certain composite tone when variable X is "1" or "−1" (S1216). The control then returns to step S1202.

As apparent from the above description, the present embodiment enables the broadcast reception apparatus to select a navigation information sequence corresponding to an external unit. This indicates that as many user interfaces as there are external units can be provided using navigation information selectively related to the external units used by users.

Note that in the present embodiment, the navigation information is selected according to the type of the remote controller the user operates. However, the navigation information may be selected by identifying the user from an input voice.

A button for changing the navigation information received by the broadcast reception apparatus may be formed on the remote controller.

In the present embodiment, composite tone is used to indicate whether the answer to a quiz is correct or incorrect. However, a message may be displayed on the screen for the same purpose.

Embodiment 2

FIG. 13 is a block diagram showing the construction of Embodiment 2 of the present invention, a broadcast reception apparatus.

A broadcast reception apparatus 1301 is composed of a reception unit 102, a TS decoder unit 103, an AV decoder unit 104, an apparatus information storage unit 1302, a navigation information storage unit 106, a signal reception unit 107, a reproduction control unit 1303, a reception control unit 1304, a display unit 1305, and an audio output unit 111. With the above construction, the broadcast reception apparatus 1301 selects an event from a transport stream by using navigation information for each user, the transport stream being broadcast data transmitted from a broadcast apparatus (not shown in the drawings). The TS decoder unit 103 includes a filter condition storing unit 112. The signal reception unit 107 receives user operation signals from a remote controller 113 being an external apparatus.

The broadcast reception apparatus 1301 is composed of almost the same components as the broadcast reception apparatus 101 of Embodiment 1. Accordingly, the following description mainly deals with features unique to the present embodiment, with the same reference signs attached to the same components.

FIG. 14 shows the contents of the transport streams received by the reception unit 102.

A transport stream 1401 includes a video stream 1402 being video data of a movie "Lost World" and also includes three kinds of navigation information, NVT (0), (1), and (2). The video stream 1402 and either of the NVT (1) and (2) make up an event.

Each piece of navigation information includes graphics data 1403, display information 1404, and script information 1405. The display information 1404 specifies a display position of the graphics data. NVTs (0), (1), and (2) are respectively for display units 1305 with the wide screen with aspect ratio "16:9," the normal screen with aspect ratio "4:3," and small-scale LCD screen.

FIG. 15 shows a variety of pieces of script information corresponding to the NVTs (0), (1), and (2). The script information specifies a combination operation and a display operation of the graphics data to be displayed on the display unit 1305. For example, NVT (0) specifies that a composite image of graphics data 1403 being superimposed on the image data should be displayed over a time period between time t1 and time t5 if the aspect ratio of the display unit 1305 is 4:3 (normal), and that a composite image of translucent graphics data 1403 being superimposed on the image data by "alpha blending" should be displayed for one second out of 10 seconds during a period between time t1 and time t5 if the aspect ratio of the display unit 1305 is 16:9 (wide).

When a normal-size image is displayed on a wide-size TV, the right-hand and left-hand edges of the screen (letter boxes) do not display image. Display information 1404 of NVT (0) specifies display positions of the letter boxes, indicating the areas on the screen occupied by the letter boxes. Display information 1404 of NVT (1) specifies display positions of top and bottom letter boxes which are generated when a wide-size image is displayed on a normal-size TV. Display information 1404 of NVT (2) specifies almost whole screen of the small-scale LCD screen as a display position since the small-scale LCD screen has such a low resolution as users may feel difficulty in reading small letters.

Figure 16:
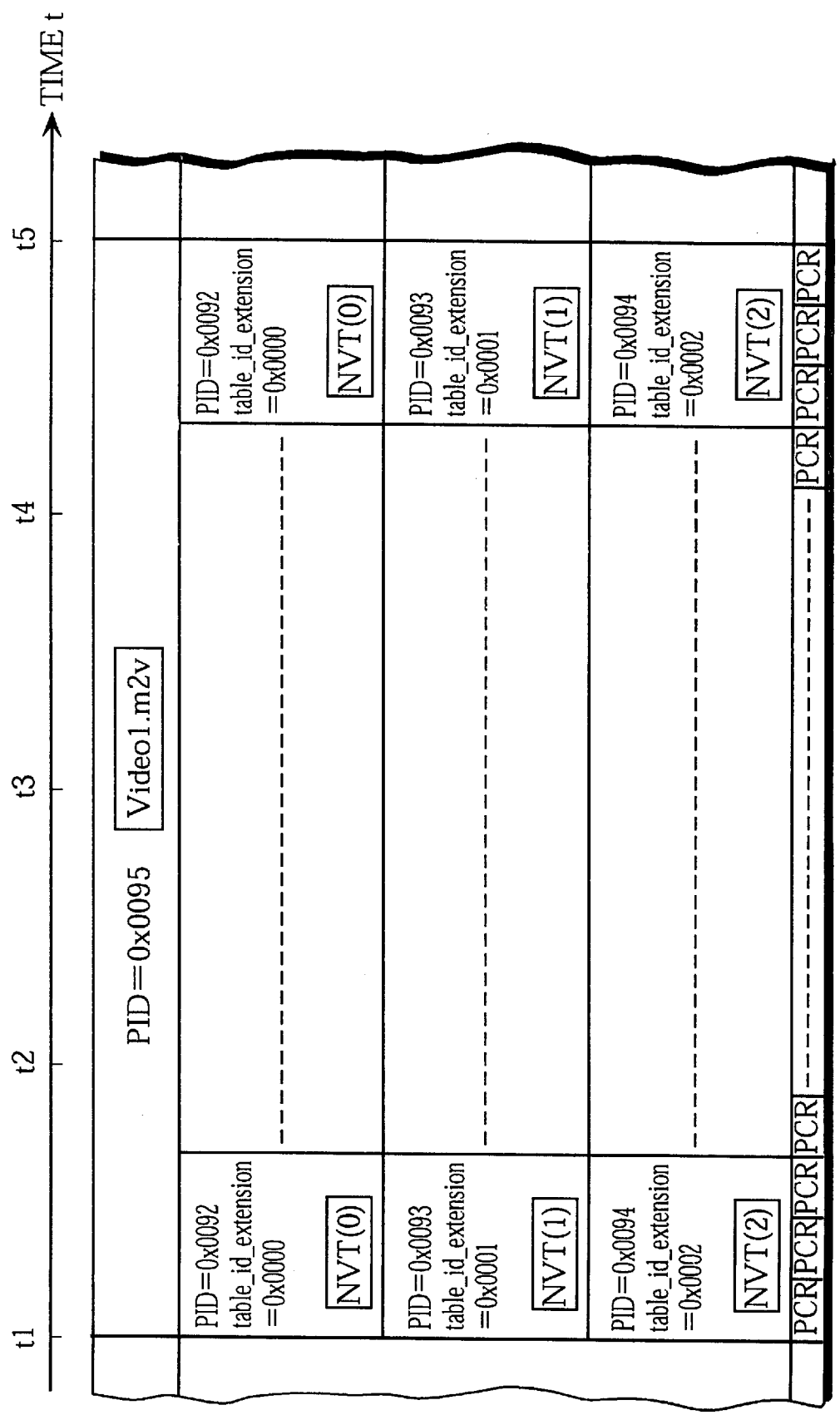
FIG. 16 shows a transport stream of Embodiment 2.

FIG. 16 shows the transport stream 1401 being transmitted from a broadcast station. The navigation information NVTs (0), (1), and (2) are transmitted repeatedly during the period between time t1 and time t5.

The video stream of the movie "Lost World" has PID "0x0095" as the identification information.

NVT (0) has PID "0x0092" and table_id_extension "0x0000," NVT (1) has PID "0x0093" and table_id_extension "0x0001," NVT (2) has PID "0x0094" and table_id_extension "0x0002" as respective identification information.

FIG. 17 shows relationships between screen types of the display unit 1305 and the navigation information. The wide screen is related to table_id_extension "0x0000" of NVT (0). The normal screen is related to table_id_extension "0x0001" of NVT (1). The small-scale LCD screen is related to table_id_extension "0x0002" of NVT (2).

The reproduction control unit 1303 notifies the reception control unit 1304 of the screen type (wide, normal, or small-scale LCD) of the display unit 1305.

The reproduction control unit 1303 also notifies the reception control unit 1304 of the image size (wide or normal) of the video stream 1402 having been decoded by the AV decoder unit 104.

On receiving graphics data, display information, composite operation information (indicating either of superimposing or alpha blending), and display time information from the reception control unit 1304, the reproduction control unit 1303 superimposes the graphics data on or combines the graphics data with the image data of the video stream having been decoded by the AV decoder unit 104 according to the display information and displays the composite image on the display unit 1305 as specified by the display time information referring to the clock unit of the AV decoder unit 104.

On receiving the screen type (wide, normal, or small-scale LCD) of the display unit 1305 from the reproduction control unit 1303, the reception control unit 1304 reads out from the apparatus information storage unit 1302 the table identification extension of the navigation information corresponding to the received screen type, refers to the system information which is not shown in the drawings, and stores the filter condition of this navigation information in the filter condition storing unit 112 of the TS decoder unit 103.

On receiving the aspect ratio of the image of the video stream 1402 having been decoded by the AV decoder unit 104 from the reproduction control unit 1303, the reception control unit 1304 reads the navigation information from the navigation information storage unit 106. The reception control unit 1304 then sends graphics data, display information, composite operation information (indicating either of superimposing or alpha blending), and display time information to the reproduction control unit 1303.

The display unit 1305 is achieved by a normal-size, a wide-size, or a small-scale LCD TV.

The following is a description of specific display operations on the display unit 1305.

Figure 18:
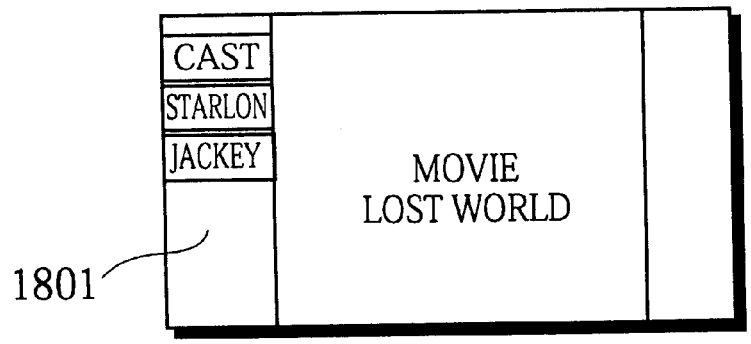
FIG. 18 shows an image displayed on the display unit of Embodiment 2.
Figure 19:
FIG. 19 shows an image displayed on the display unit of Embodiment 2.

FIG. 18 shows a screen displayed on the display unit 1305 during a period between time t1 and time t2 if the display unit 1305 has the wide screen. Here, the navigation information storage unit 106 stores NVT (0). A letter box 1801 of the wide screen displays graphics data 1403 specified by NVT (0). FIG. 19 shows a screen displayed on the display unit 1305 during a period between time t2 and time t5 if wide-size images are transmitted, as indicated by arrow T in FIG. 14. Note that the video as the main image changes with time and that the portions covered with slashes in the drawing represent translucent graphics data. The graphics data is displayed for one second out of 10 seconds during a time period between time t2 and time t5.

The translucent graphics data prevents the image under the graphics data from being entirely covered. Also, the graphics data is displayed intermittently, which enables to display useful information without disturbing the user in his/her watching the video.

Figure 20:
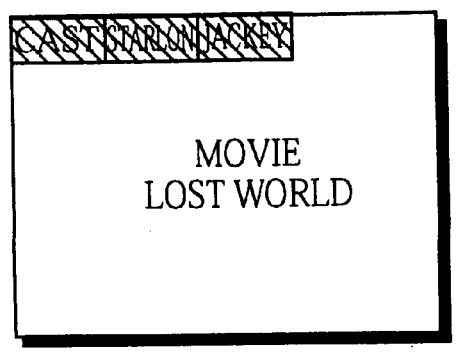
FIG. 20 shows an image displayed on the display unit of Embodiment 2.
Figure 21:
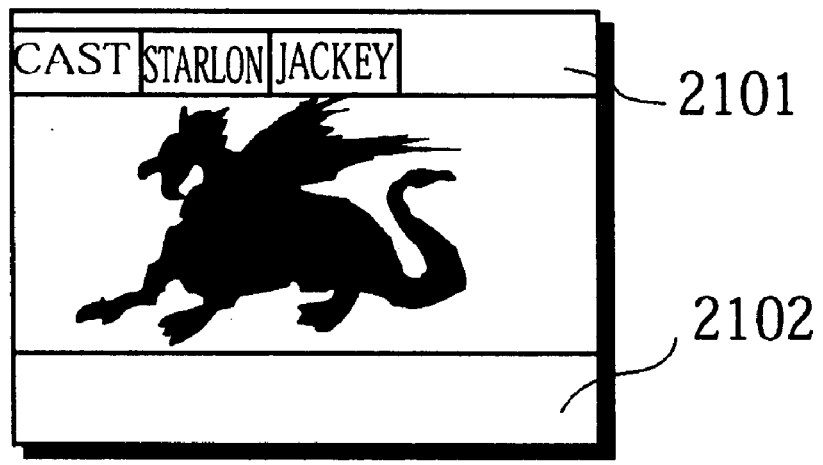
FIG. 21 shows an image displayed on the display unit of Embodiment 2.

The navigation information storage unit 106 stores NVT (1) when the display unit 1305 has a normal-size screen. FIG. 20 shows a screen displayed on the display unit 1305 of normal size during the period between time t1 and time t2. The drawing shows that translucent graphics data is displayed on the image showing the title of the movie "Lost World." The graphics data is displayed for one second out of 10 seconds. As shown in FIG. 21, letter boxes 2101 and 2102 appear in the top and bottom portions of the screen during a period between time t2 and time t5 if wide-size images are transmitted, as indicated by arrow T in FIG. 14. The graphics data is superimposed on a top letter box 2101.

Figure 22:
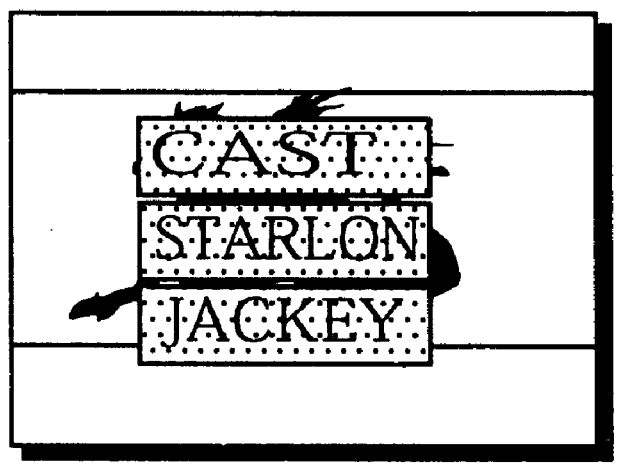
FIG. 22 shows an image displayed on the display unit of Embodiment 2.

The navigation information storage unit 106 stores NVT (2) when the display unit 1305 is a small-scale LCD. FIG. 22 shows a screen displayed for three seconds on the display unit 1305 of the small-scale LCD if the video stream 1402 is selected after time t2. The graphics data covers almost the entire screen so that large characters are displayed since the small characters displayed on the small-scale LCD are difficult for the user to read. Also, the graphics data is displayed only for a certain period so that it does not disturb the user in his/her watching the video.

Figure 23:
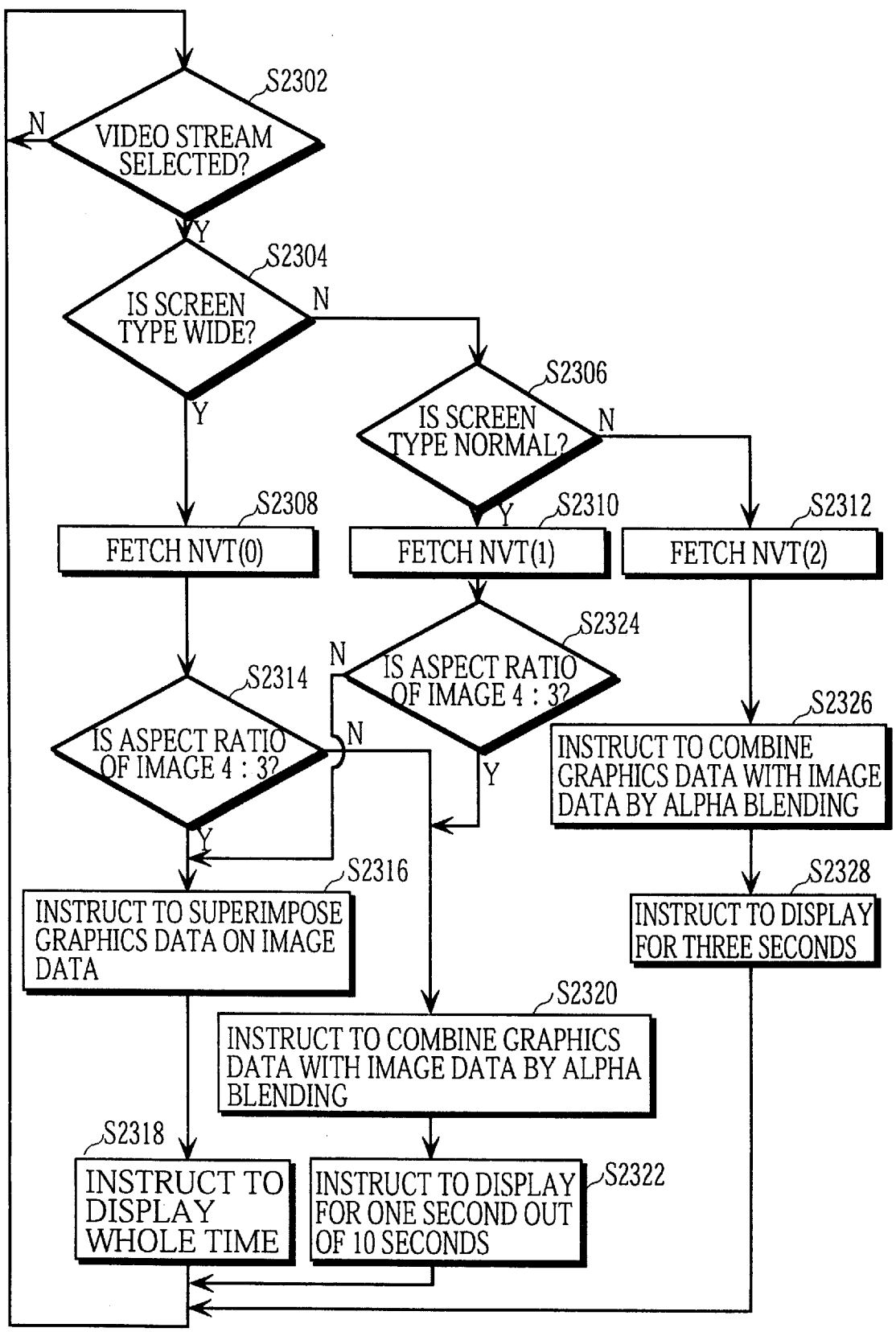
FIG. 23 is a flowchart showing the operation of Embodiment 2.

Now, the operation of the present embodiment is described with reference to the flowchart shown in FIG. 23.

The reception control unit 1304 judges whether a video stream has been selected by the user (S2302). When a video stream has been selected, a filter condition corresponding to the selected video stream is stored in the filter condition storing unit 112 of the TS decoder unit 103. Then, on receiving information from the reproduction control unit 1303, the reception control unit 1304 judges whether the screen type of display unit 1305 is "wide" (S2304). When the screen type is not "wide," the reception control unit 1304 judges whether the screen type of display unit 1305 is "normal" (S2306).

When it is judged that the screen type is "wide" in step S2304, the reception control unit 1304 sets a filter condition to fetch NVT (0) (S2308). When it is judged that the screen type is "normal" in step S2306, the reception control unit 1304 sets a filter condition to fetch NVT (1) (S2310). When it is judged that the screen type is "normal" in step S2306, the reception control unit 1304 sets a filter condition to fetch NVT (2) recognizing the screen type as small-scale LCD (S2312).

After having fetched NVT (0), the reception control unit 1304 judges whether the aspect ratio of the decoded image is 4:3 (normal size) (S2314). When having judged that the aspect ratio is 4:3, the reception control unit 1304 instructs the reproduction control unit 1303 to superimpose the graphics data on image data and sends the graphics data and display information to the reproduction control unit 1303 (S2316). The reception control unit 1304 then instructs the reproduction control unit 1303 to display the graphics data through the whole time (S2318), and returns to step S2302.

When having judged that the aspect ratio is not 4:3 in step S2324, the reception control unit 1304 instructs the reproduction control unit 1303 to combine the graphics data with the image data by alpha blending, and sends the graphics data and display information to the reproduction control unit 1303 (S2320). The reception control unit 1304 then instructs the reproduction control unit 1303 to display the graphics data for one second out of 10 seconds (S2322), and returns to step S2302.

After having fetched NVT (1), the reception control unit 1304 judges whether the aspect ratio of the decoded image is 4:3 (S2324). When having judged that the aspect ratio is 4:3, the reception control unit 1304 executes steps S2320 and 2322 to return to step 2302. When having judged that the aspect ratio is not 4:3, the reception control unit 1304 executes steps S2316 and 2318 to return to step 2302.

After having fetched NVT (2), the reception control unit 1304 judges whether the aspect ratio of the decoded image is 4:3 (S2324). When having judged that the aspect ratio is 4:3, the reception control unit 1304 instructs the reproduction control unit 1303 to combine the graphics data with the image data by alpha blending, and sends the graphics data and display information to the reproduction control unit 1303 (S2326). The reception control unit 1304 then instructs the reproduction control unit 1303 to display the graphics data for three seconds (S2328), and returns to step S2302.

As described above, it is possible for the broadcast reception apparatus of the present embodiment to select navigation information in accordance with the screen types of the display unit 1305 to achieve user interfaces that display graphics data without disturbing the user in watching video images.

In the present embodiment, the graphics data is displayed on the display unit 1305 for a certain period of time. However, the graphics data may be displayed when the user presses the screen display key 504 on the remote controller 113.

Also, the graphics data may be presented by scrolling display as in text broadcasting.

Further, the images may be displayed after being compressed so that the user can watch the graphics data without difficulty (e.g., the video data is compressed in the vertical direction so that the graphics data is displayed on top and bottom blank portions of the screen which are generated by the compression).

Embodiment 3

FIG. 24 is a block diagram showing the construction of Embodiment 3 of the present invention, a broadcast reception apparatus.

A broadcast reception apparatus 2401 is composed of a reception unit 102, a TS decoder unit 103, an AV decoder unit 104, an apparatus information storage unit 2402, a navigation information storage unit 106, a signal reception unit 107, a reproduction control unit 109, a reception control unit 2404, a display unit 110, an audio output unit 111, and a modem 2403. With the above construction, the broadcast reception apparatus 1301 selects an event from a transport stream by using navigation information related to the status of the broadcast reception apparatus 2401, the transport stream being transmitted from a broadcast apparatus (not shown in the drawings). The TS decoder unit 103 includes a filter condition storing unit 112. The signal reception unit 107 receives user operation signals from a remote controller 113 being an external apparatus. Modem 2403 is connected by a public network 2405 to an audience authorization center (not shown in the drawings) of a pay program provider.

The broadcast reception apparatus 2401 is constructed almost the same as the broadcast reception apparatus of Embodiment 1. Therefore, the following description mainly deals with features unique to the present embodiment, with the same reference signs attached to the same components.

A transport stream 2501 includes a video stream 2502 being video data of a movie "Lost World" which is a pay broadcast program and also includes three navigation information sequences 2503, 2504, and 2505. The video stream 2502 and one out of the navigation information sequences 2503, 2504, and 2505 make up an event.

The navigation information sequence 2503, composed of navigation information NVTs (0,0) and (0,1), is fetched first when the video stream of the movie "Lost World," a pay broadcast program, selected.

The navigation information sequence 2504, composed of navigation information NVTs (1,0) and (1,1), is fetched for users who have been authorized to view the pay broadcast program.

The navigation information sequence 2505, composed of navigation information NVT (2,0), is fetched for users who have been authorized to view the pay broadcast program. Each navigation information includes graphics data 2506, display information (not shown in the drawings), and script information 2507.

FIG. 26 shows a variety of pieces of script information included in the navigation information. The reception control unit 2404 refers to the script information to give an instruction to the reproduction control unit 109, sets a filter condition for the TS decoder unit 103 to fetch a new piece of navigation information, and connects via modem 2403 to the audience authorization center by telephone line.

The transport stream 2501 is not described here since it is similar to ones shown in FIGS. 4 and 16.

As shown in FIG. 27, the apparatus information storage unit 2402 stores entry navigation information and a telephone number. The entry navigation information specifies a piece of navigation information which should be fetched first when the TS decoder unit 103 separates the video stream 2502 of the pay program. The telephone number is used for checking whether the user is authorized to view the pay program.

The modem 2403, connected to the public network 2405, connects the broadcast reception apparatus 2401 to the audience authorization center when the reception control unit 2404 instructs so.

The reception control unit 2404 stores identification information of the video stream 2502 in the filter condition storing unit 112 as a filter condition when the video stream 2502 for the pay broadcast program movie "Lost World" is selected. The reception control unit 2404 then reads the entry navigation information from the apparatus information storage unit 2402 and stores identification information of either of NVTs (0,0) and (0,1) in the filter condition storing unit 112 as a filter condition so that NVT (0,N) is fetched.

The reception control unit 2404 then reads out the script information of NVT (0,0) or (0,1) from the navigation information storage unit 106, sets variable X to an initial value "2," sends the graphics data, display information, and time information to the reproduction control unit 109 with an instruction to superimpose the graphics data on the image data decoded by the AV decoder unit 104.

The reception control unit 2404 sets variable X to "0" when having received a signal from the signal reception unit 107 which indicates that the user has entered the selected pay program.

The reception control unit 2404 then reads out the telephone number of the audience authorization center from the apparatus information storage unit 2402. The reception control unit 2404 connects to the center via the modem 2403 and sends the identification information of the broadcast reception apparatus 2401 itself to check whether the user is authorized to view the pay program. If the user has paid a fee for viewing the program, the audience authorization center sends an audience authorization signal to the broadcast reception apparatus 2401 together with a permitted audience time period. If the user has not paid the fee, the audience authorization center sends an audience unauthorization signal.

The reception control unit 2404 sets variable X to "1" when receiving the audience authorization signal, and sets it to "−1" when receiving the audience unauthorization signal.

Having set variable X to "1," the reception control unit 2404 stores a filter condition in the filter condition storing unit 112 so that either of NVTs (1,0) and (1,1) is fetched. Here, NVT (1,0) is fetched during the period between time t1 and time t2; NVT (1,1) is fetched after time t2.

Having set variable X to "−1, " the reception control unit 2404 stores a filter condition in the filter condition storing unit 112 so that NVT (2,0) is fetched.

When the navigation information storage unit 106 newly stores a piece of navigation information, the reception control unit 2404 gives instructions to the reproduction control unit 109 in accordance with the script information written in the new piece of navigation information. If the new piece of navigation information is NVT (1,0) and variable X is "1," the reception control unit 2404 sends graphics data, display information, and time information to the reproduction control unit 109 and instructs it to superimpose the graphics data on the image data and display the composite image. If the new piece of navigation information is NVT (1,1) and variable X is "1," the reception control unit 2404 sends graphics data and display information to the reproduction control unit 109 and instructs it to superimpose the graphics data on the image data and display the composite image for two seconds. The reception control unit 2404 then activates a timer and continues to reproduce the pay program until the permitted audience time period has expired. When the permitted audience time period has expired, the reception control unit 2404 sets variable X to "−1" and stores a filter condition in the filter condition storing unit 112 so that NVT (2,0) is fetched.

When the navigation information storage unit 106 stores NVT (2,0) and variable X is "−1," the reception control unit 2404 sends graphics data, display information, and time information to the reproduction control unit 109 and instructs it to superimpose the graphics data on the image data and display the composite image.

Figure 28:
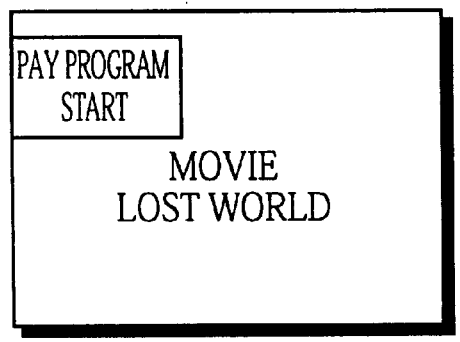
FIG. 28 shows an image displayed on the display unit of Embodiment 3.

Suppose the video stream 2502 for the movie "Lost World" is selected during a period between time t1 and time t2, the display unit 110 displays an image as shown in FIG. 28.

Figure 29:
FIG. 29 shows an image displayed on the display unit of Embodiment 3.
Figure 30:
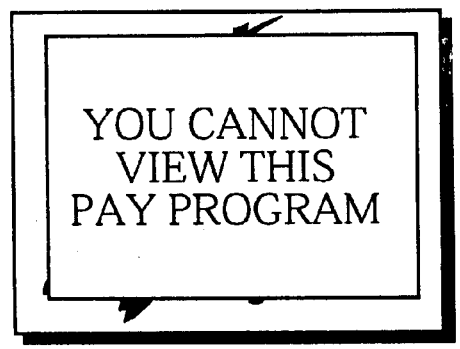
FIG. 30 shows an image displayed on the display unit of Embodiment 3.

Further suppose the user enters the selected pay program to view it. Then, the image shown in FIG. 29 is displayed on the display unit 110 after time t2 if the user has been authorized; the image shown in FIG. 30 is displayed on the display unit 110 after time t2 if the user has not been authorized due to nonpayment of the fee.

Figure 31:
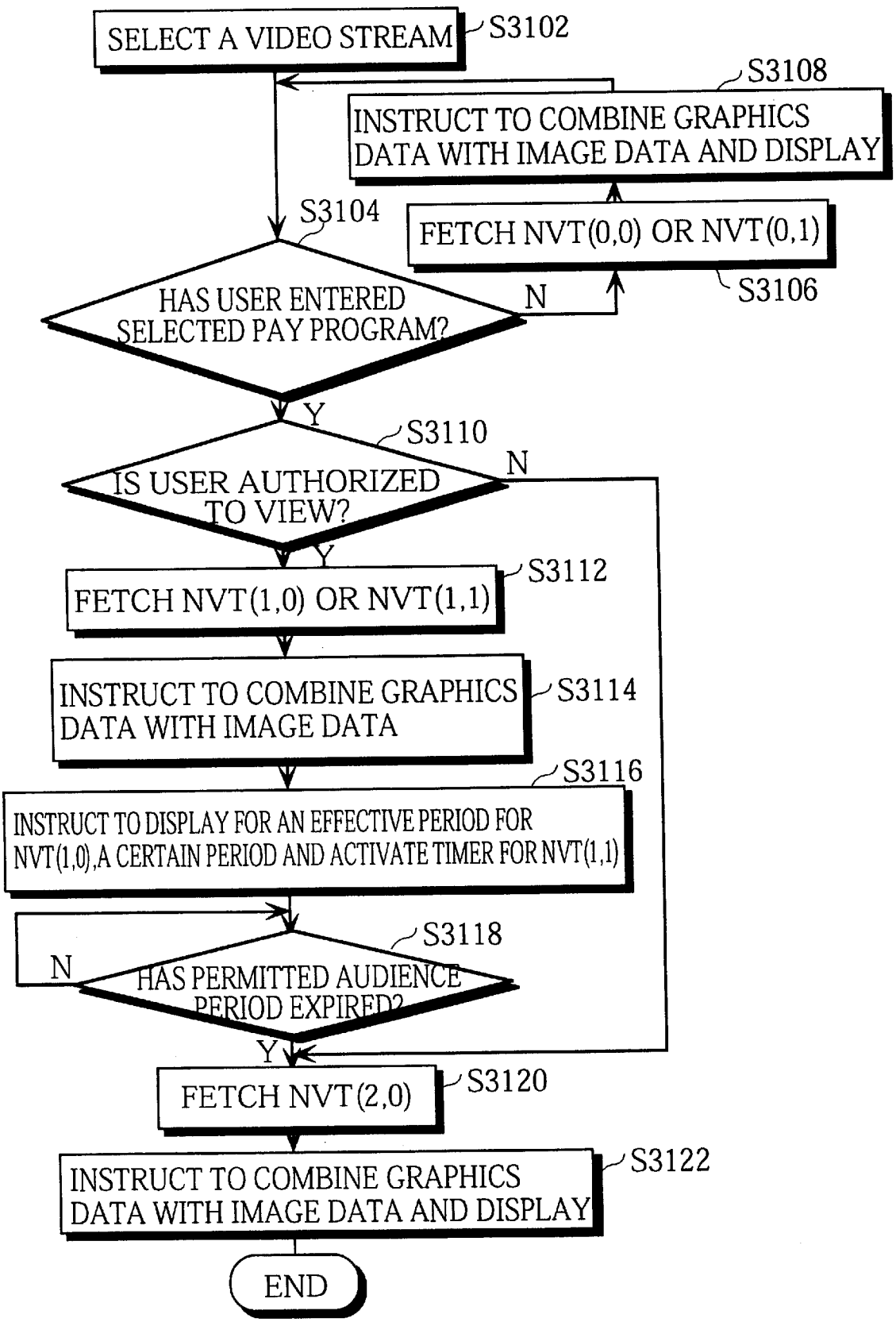
FIG. 31 is a flowchart showing the operation of Embodiment 3.

Now, the operation of the present embodiment is described with reference to the flowchart shown in FIG. 31.

The procedure starts as the user selects a video stream which is a pay program (S3102). Then, it is judged in step S3104 whether the user has entered the selected pay program indicating that the user has decided to view the program (S3104). When the user has not entered the selected pay program, the reception control unit 2404 stores a filter condition to fetch either of NVTs (0,0) and (0,1) (S3106). The reception control unit 2404 then instructs the reproduction control unit 109 to combine the graphics data specified by the fetched navigation information with the image data and display the composite image (S3108). The steps S3106 and S3108 are repeated until the user enters the selected pay program.

When the user has entered the selected pay program, the reception control unit 2404 judges whether the user has been authorized to view the pay program by connecting to the audience authorization center via the modem 2403 through the public network 2405 and sending the identification information of the broadcast reception apparatus 2401 itself (S3110). Control goes to step S3120 when the user has not been authorized to view the pay program.

When it is judged that the user has been authorized to view the pay program in step S3110, the reception control unit 2404 stores a filter condition to fetch either of NVTs (1,0) and (1,1) (S3112).

The reception control unit 2404 then instructs the reproduction control unit 109 to combine the graphics data specified by the fetched navigation information with the image data (S3114). When NVT (1,0) is fetched, the reception control unit 2404 instructs the reproduction control unit 109 to display the composite image for an effective period; when NVT (1,1) is fetched, the reception control unit 2404 instructs the reproduction control unit 109 to display the composite image for a certain period and activates the timer (S3116).

The reproduction of the pay program is continued until the permitted audience time period has expired. It is judged whether the permitted audience time period has expired in step S3118. When it is judged so, the reception control unit 2404 stores a filter condition to fetch NVT (2,0) (S3120). In the following step S3122, the reception control unit 2404 instructs the reproduction control unit 109 to combine the graphics data specified by NVT (2,0) with the image data and display the composite image (S3114), then ends the process.

As described above, the broadcast reception apparatus of the present embodiment asks the audience authorization center if the user is authorized to view a pay program, selects a piece of navigation information in accordance with the obtained result, and informs the user whether the user can view the program or not in an appropriate way.

In the present embodiment, the above confirmation is made by checking via the public network 2405. However, an identification card or a pre-paid card may be inserted into a reading unit of the broadcast reception apparatus for the same purpose, where the identification card indicates that the user is authorized to view the pay program, and the pre-paid card is given to users having paid the fee for viewing.

Embodiment 4

Figure 32:
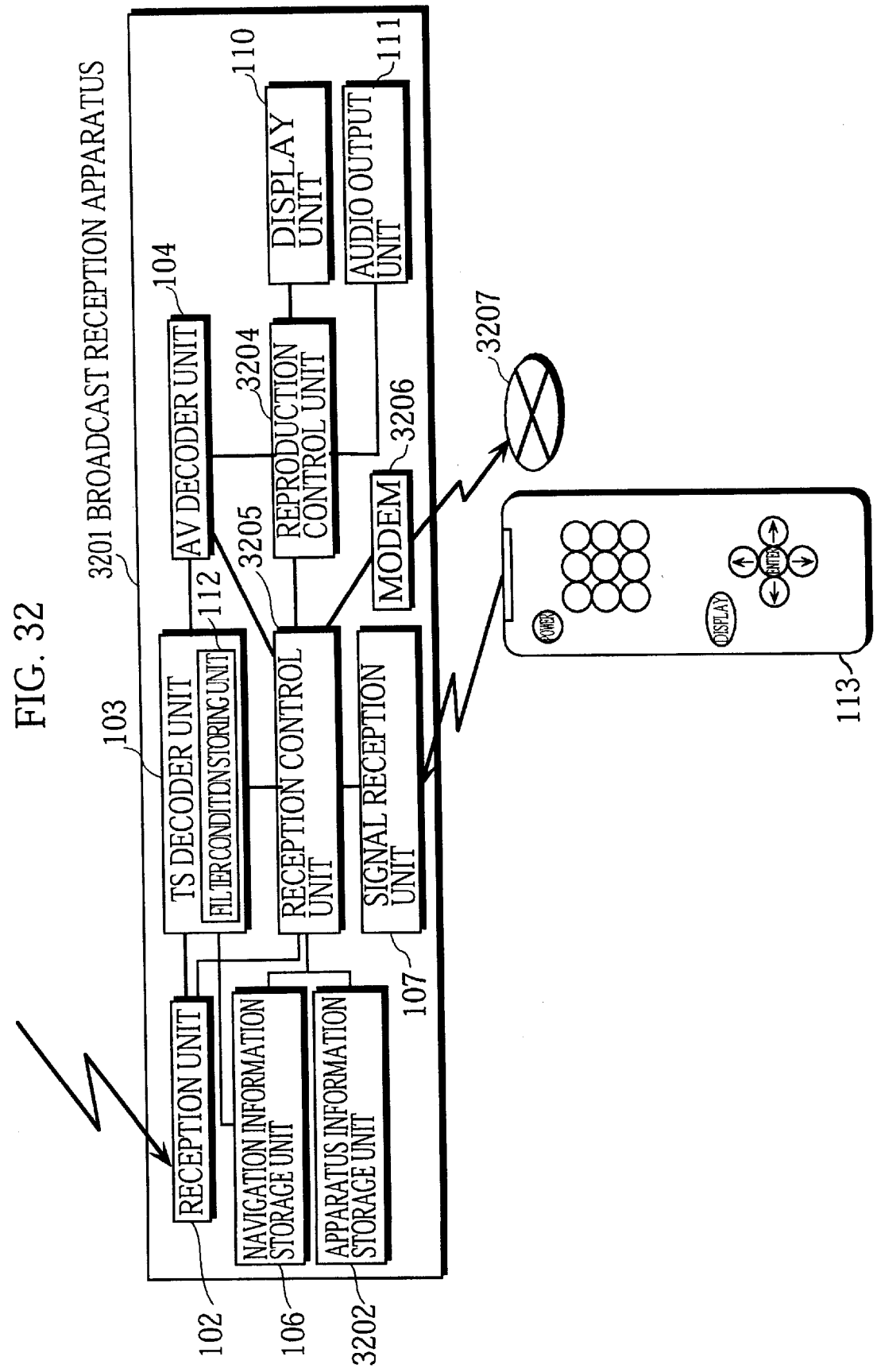
FIG. 32 is a block diagram showing the construction of Embodiment 4 of the present invention, a broadcast reception apparatus.

FIG. 32 is a block diagram showing the construction of Embodiment 4 of the present invention, a broadcast reception apparatus.

A broadcast reception apparatus 3201 is composed of a reception unit 102, a TS decoder unit 103, an AV decoder unit 104, an apparatus information storage unit 3202, a navigation information storage unit 3203, a signal reception unit 107, a reproduction control unit 3204, a reception control unit 3205, a display unit 110, an audio output unit 111, and a modem 3206. With the above construction, the broadcast reception apparatus 1301 selects an event from a transport stream by using navigation information related to the user of the broadcast reception apparatus 2401, the transport stream being transmitted from a broadcast apparatus (not shown in the drawings). The TS decoder unit 103 includes a filter condition storing unit 112. The signal reception unit 107 receives user operation signals from a remote controller 113 being an external apparatus. Modem 3206 is connected by a public network 3207 to a broadcast station (not shown in the drawings).

The broadcast reception apparatus 3201 is constructed almost the same as the broadcast reception apparatus of Embodiment 1. Therefore, the following description mainly deals with features unique to the present embodiment, with the same reference signs attached to the same components.

Figure 33:
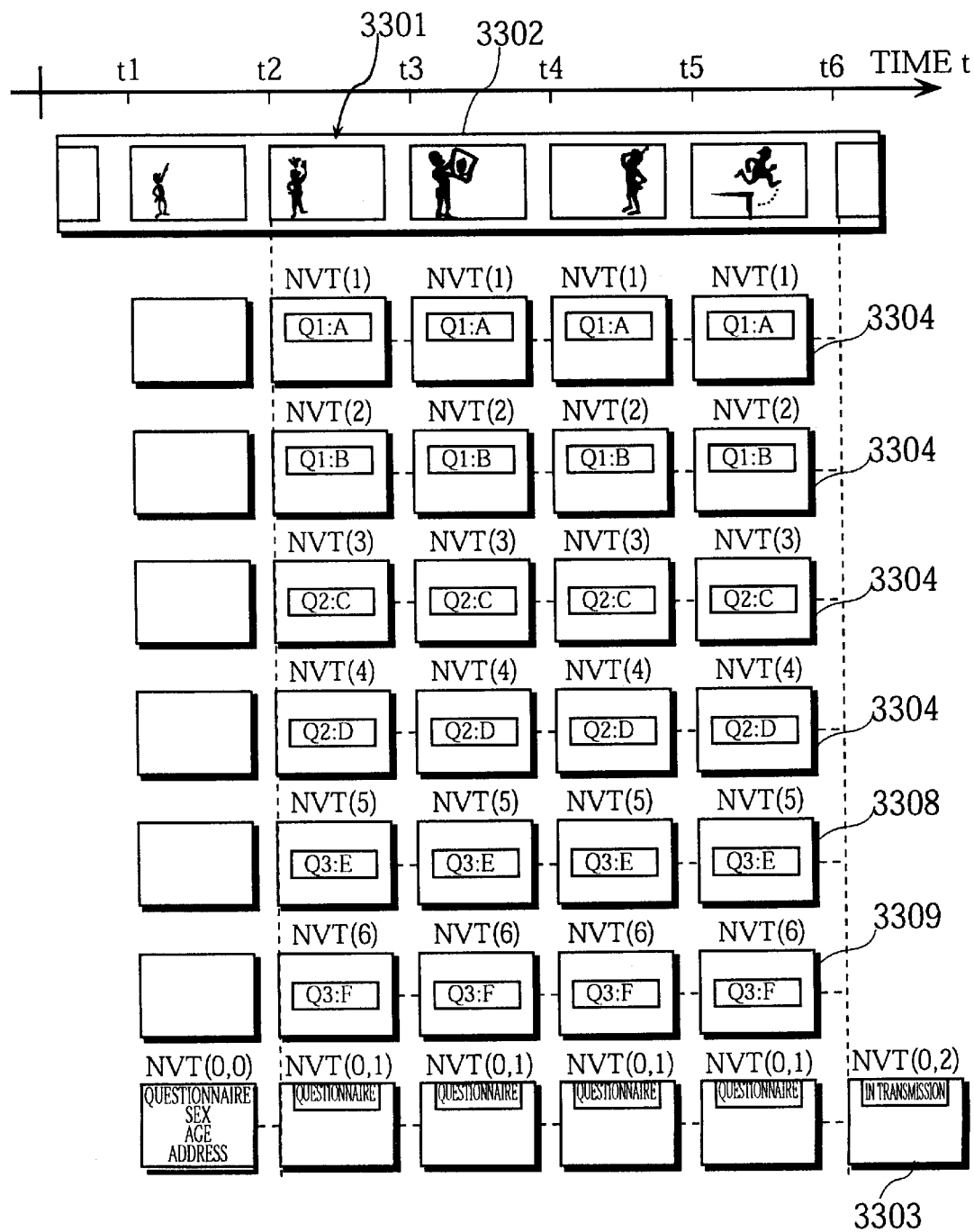
FIG. 33 shows the contents of the transport streams received by the reception unit of Embodiment 4.

FIG. 33 shows the contents of the transport stream received by the reception unit 102.

A transport stream 3301 includes a video stream 3302 and seven navigation information sequences 3303–3309, the video stream 3302 being video data used as background in a questionnaire program, the seven navigation information sequences including graphics data as respective questions given in the questionnaire program.

The navigation information sequence 3303 is composed of navigation information, NVTs (0,0), (0,1), and (0,2). NVT (0,0) is fetched first when the present questionnaire program is selected and entered. The display effective period for NVT (0,1) lasts from time t2 to time t6. The display effective period for NVT (0,2) is the time after time t6.

The navigation information sequence 3304 is composed of NVT (1). Similarly, each of the navigation information sequences 3305–3309 is composed of corresponding one of NVT (2) to NVT (6).

NVT (0,0) is repeatedly transmitted during a period between time t1 and time t2. NVT (0,1) and NVTs (1)–(6) are repeatedly transmitted during a period between time t2 and time t6. NVT (0,2) is repeatedly transmitted after time t6.

The graphics data specified by NVTs (0,0), (0,1), and (0,2) are shown in FIG. 33. The graphics data specified by NVT (0,0) is superimposed on the background image to urge the user to input user attributes by the remote controller 113. The input user attributes are used by the broadcast reception apparatus 3201 to select questions for the user. The graphics data specified by NVT (0,1) is combined with the graphics data specified by any one selected from NVTs (1)–(6) and the composite image is further superimposed on the background image to be displayed. The graphics data specified by NVT (0,2) is superimposed on the background image to inform the user that the broadcast reception apparatus 3201 is transmitting answers to the questions.

The graphics data specified by NVTs (1)–(6) are shown in FIG. 34. NVT (1) specifies Question 1 for male. NVT (2) specifies Question 1 for female. NVT (3) specifies Question 2 for adults. NVT (4) specifies Question 2 for children. NVT (5) specifies Question 3 for the Kanto district in Japan. NVT (6) specifies Question 3 for the Kansai district in Japan. Each question provides answer options "yes" and "no."

Note that each piece of navigation information includes display information and time information as well as the graphics data though the former pieces of information are not shown in the drawing.

NVTs (0,0), (0,1), and (0,2) include script information as shown in FIG. 35. A piece of script information specifies an NVT to be selected based on the user attributes input from the user by the remote controller 113. Another piece of script information specifies that the answers to the questions are transmitted to the broadcast station.

The user attributes dealt with by the script information of NVT (0,0) are "sex," "age," and "address." A reception control unit 3205, which is later described, sets variable X to "1" when the user operates a certain key on the remote controller 113 to inform that the user is male, sets variable X to "2" when the user is female, sets variable Y to "3" when the user informs of his age being 20 or more, sets variable Y to "4" when the user informs of his age being less than 20, sets variable Z to "5" when the user lives in the Kanto district, and sets variable Z to "6" when the user lives in the Kansai district.

Variable X is used to select either of NVTs (1) and (2). Similarly, variable Y is used to select either of NVTs (3) and (4) and variable Z is used to select either of NVTs (5) and (6).

The reception control unit 3205 sets variables A1, A2, and A3 to "0" as the respective initial values. Variables A1, A2, and A3 are set to "1" or "2" in accordance with the answers to the questions.

The script information of NVT (0,1) specifies a display operation of combining four pieces of graphics data specified by NVTs (0,1), (X), (Y), and (Z) together and displaying the composite image. The script information of NVT (0,1) also specifies an input operation of setting variables A1, A2, and A3 to "1" or "2."

Suppose the user enters "1 yes" as an answer to question 1, then the reception control unit 3205 sets variable A1 to "1." Similar operations are performed for variables A2 and A3.

The script information of NVT (0,2) specifies that the values as variables X, Y, Z, A1, A2, and A3, which are set in accordance with information input from the user during a period between time t1 and time t6, are transmitted to the broadcast station.

The apparatus information storage unit 3202 stores entry navigation information, the entry navigation information being identification information of NVT (0,0) which is fetched first when the video stream 3302 is separated from the transport stream 3301 in accordance with a user operation. The apparatus information storage unit 3202 also stores identification information of NVTs (0,1) and (0,2) and the telephone number of the broadcast station.

The navigation information storage unit 3203 stores the navigation information separated from the transport stream by the TS decoder unit 103. The present embodiment differs from Embodiments 1–3 in that the navigation information storage unit 3203 stores a plurality of pieces of navigation information.

The reproduction control unit 3204, on receiving the graphics data, display information, and time information from the reception control unit 3205, combines the graphics data with the image data decoded by the AV decoder unit 104 and displays the composite image on the display unit 110 for the display effective period.

The reception control unit 3205 stores a filter condition in the filter condition storing unit 112 of the TS decoder unit 103 so that the video stream 3302 is separated from the transport stream 3301 received by the reception unit 102 when the user selects and enters the questionnaire program. The reception control unit 3205 then reads the entry navigation information from the apparatus information storage unit 3202 and stores a filter condition for NVT (0,0) in the filter condition storing unit 112.

When NVT (0,0) is stored in the navigation information storage unit 3203, the reception control unit 3205 reads out the graphics data, display information, and time information as specified in NVT (0,0) and also reads out the script information (see FIG. 35). The reception control unit 3205 sends the graphics data, a combination instruction, and a display instruction to the reproduction control unit 3204.

On receiving information from the user via the signal reception unit 107, the reception control unit 3205 sets variables X, Y, and Z to respective values and sets variables A1, A2, and A3 to "0" as their initial values.

The reception control unit 3205 stores filter conditions in the filter condition storing unit 112 to fetch NVTs (X), (Y), (Z), and (0,1) in accordance with the values specified as variables X, Y, and Z.

When the navigation information storage unit 3203 stores NVTs (X), (Y), (Z), and (0,1), the reception control unit 3205 reads out the script information of NVT (0,1), sends the graphics data of NVTs (X), (Y), (Z), and (0,1) to the reproduction control unit 3204 in accordance with the read script information, instructing to combine the sent graphics data with the image data and display the composite image.

On receiving signals from the user via the remote controller and the signal reception unit 107, the reception control unit 3205 sets variables A1, A2, and A3 to certain values in accordance with the input operation specified in the script information (see FIG. 35). When it pasts time t6 after the above values have been set, the reception control unit 3205 stores a filter condition in the filter condition storing unit 112 to fetch NVT (0,2).

When the navigation information storage unit 3203 stores NVT (0,2), the reception control unit 3205 sends the graphics data of NVT (0,2) to the reproduction control unit 3204 with an instruction to combine the sent graphics data with the image data and display the composite image.

The reception control unit 3205 reads out the telephone number of the broadcast station from the apparatus information storage unit 3202 and connects the broadcast reception apparatus 3201 to the broadcast station via the modem 3206 and the public network 3207. The reception control unit 3205 then transmits the values of variables X, Y, Z, A1, A2, and A3 to the broadcast station.

Modem 3206 is used to connect the broadcast reception apparatus 3201 to the broadcast station (not shown in the drawings) via the public network 3207.

Figure 36:
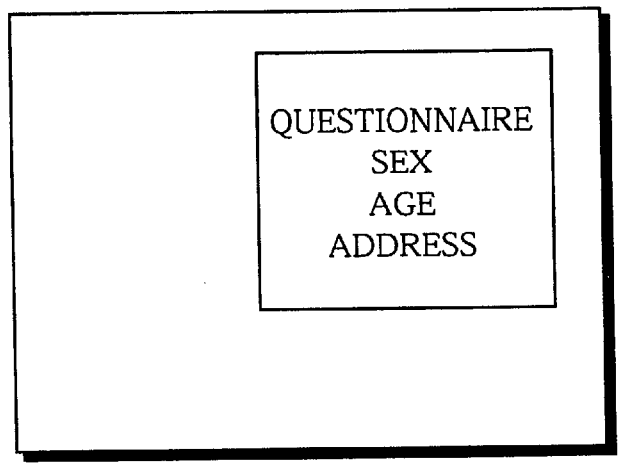
FIG. 36 shows an image displayed on the display unit of Embodiment 4.
Figure 37:
FIG. 37 shows an image displayed on the display unit of Embodiment 4.

The following is a description of specific display operations on the display unit 110. FIG. 36 shows an image displayed on the display unit 110 during a period between time t1 and time t2 after the user selects and enters the questionnaire program. FIG. 37 shows an image displayed on the display unit 110 during a period between time t2 and time t6 after the user inputs information using the remote controller 113 that the user is female, 20 or more in age, and lives in the Kansai district. Note that the background has changed.

During the period between time t2 and time t6, the user answers to the questions using keys on the remote controller 113, such as "↓," "→," and "enter." The reception control unit 3205 converts the received information into certain values and, after time t6, transmits the values to the broadcast station via the modem 3206.

Figure 38:
FIG. 38 shows an image displayed on the display unit of Embodiment 4.

FIG. 38 shows an image displayed on the display unit 110 during a period between time t2 and time t6 after the user inputs information that the user is male, 20 or more in age, and lives in the Kanto district.

Figure 39:
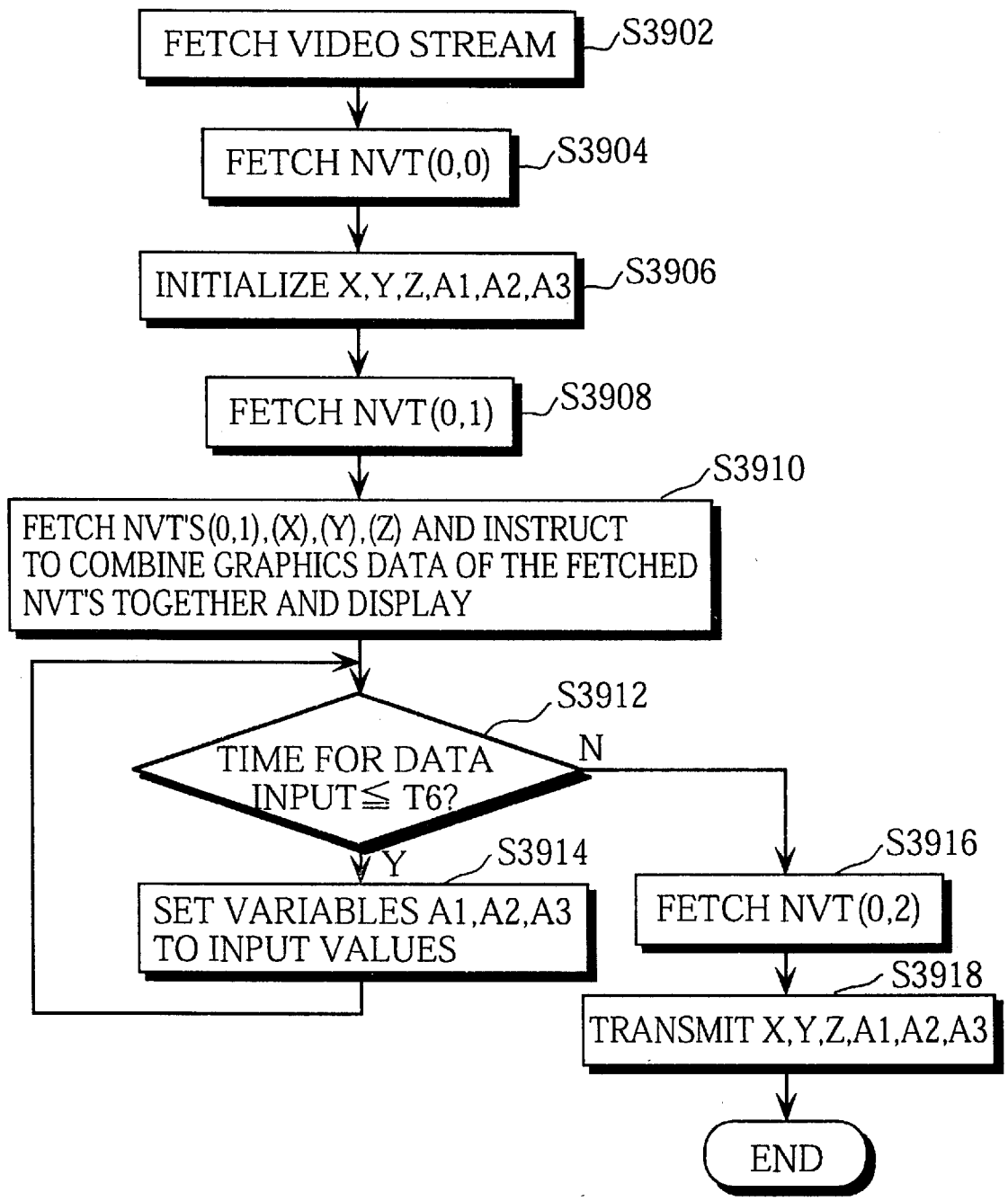
FIG. 39 is a flowchart showing the operation of Embodiment 4.

Now, the operation of the present embodiment is described with reference to the flowchart shown in FIG. 39.

The reception control unit 3205 stores a filter condition in the filter condition storing unit 112 to fetch the video stream 3302 when the questionnaire program is selected and entered (S3902).

The reception control unit 3205 then stores a filter condition in the filter condition storing unit 112 to fetch NVT (0,0) as entry navigation information (S3904).

After the user enters his/her sex, age, and address on the screen shown in FIG. 36, the reception control unit 3205 sets variables X, Y, and Z to certain values and sets variables A1, A2, and A3 to initial values (S3906).

After time t2, the reception control unit 3205 stores a filter condition in the filter condition storing unit 112 to fetch NVT (0,1) (S3908). The reception control unit 3205 then stores filter conditions in the filter condition storing unit 112 to fetch NVTs (X), (Y), and (Z) and instructs the reproduction control unit 3204 to combine the sent graphics data of NVTs (X), (Y), (Z), and (0,1) with the image data and display the composite image (S3910). The reception control unit 3205 continues to receive answers from the user to the questions until time t6 (S3912). The reception control unit 3205 sets variables A1, A2, and A3 to certain values (S3914).

After time t6, the reception control unit 3205 stores a filter condition in the filter condition storing unit 112 to fetch NVT (0,2) (S3916). The reception control unit 3205 then instructs the reproduction control unit 3204 to combine the graphics data with the image data and display the composite image, and transmits the values of variables X, Y, Z, A1, A2, and A3 to the broadcast station (S3918). This operation procedure ends with this process.

The present embodiment deals with a questionnaire program. However, the present embodiment may also be applied to a quiz program. Suppose a different set of questions are given to each of two types of respondents (users), with three questions per screen. The combination is represented as 2×2×2=8. If the combination should be arranged in the broadcast station side, the broadcast station needs to provide eight pieces of navigation information. On the other hand, if the broadcast reception apparatus 3201 arranges the three questions for each user type, the combination of the questions is represented as 3×2=6. When this happens, less pieces of navigation information are used to provide the same quality of services when the broadcast reception apparatus 3201 creates one piece of navigation information with three questions. This leads to a cost down of the apparatus due to reduction of the capacity of navigation information storage unit 3203.

As described above, a lot of display patterns are gained by combining a small number of pieces of navigation information in the present embodiment.

In the present embodiment, the questionnaire text is displayed on the display unit 110. However, the text may be output as composite tone from the audio output unit 111 so that the user can understand the questions.

The audio data is not described in detail in the above embodiments. Actually, however, the audio data is multiplexed in the transport stream and is output from the audio output unit 111 in synchronization with corresponding images.

The navigation information described in Embodiments 1–4 may be transmitted from a broadcast apparatus as a navigation information table, such as NVT (0,2) shown in FIG. 40.

The navigation information table 4001 shown in FIG. 40 includes the same contents as NVT (0,2) for the navigation information sequence 203 described in Embodiment 1 (see FIGS. 2 and 3).

The navigation information table 4001 includes object definition table 4002, handler definition table 4003, and bitmap table 4004.

The object definition table 4002 shows types and attributes of graphics objects. For example, "button" is one type of the graphics objects. The "index" column shows index numbers for objects. The "type" column shows types of the graphics objects. The "X" and "Y" columns respectively show the coordinate values of display standard positions on the display screen. The "handler" column shows index numbers for handlers which are executed when corresponding objects are selected. The "normal bitmap" column shows index numbers for bitmaps which are displayed when corresponding objects are in normal state. The "focused bitmap" column shows index numbers for bitmaps which are displayed when corresponding objects are in selected state. The normal state indicates that the corresponding object is merely displayed. The selected state indicates that the corresponding object is selected.

For example, the object definition table 4002 indicates that for the object with index number "0," the handler with index number "3" is executed, that in the normal state, the bitmap with index number "6" is displayed, and that in the selected state, the bitmap with index number "7" is displayed. This is similarly applied to the objects with index numbers "1" and "2."

The handler definition table 4003 shows scripts which each define operations of the broadcast reception apparatus 101 related to user operations.

For example, the script for the handler with index number "3" states "PlayAudio("BEEEEE")." This script defines an instruction to output composite tone of a buzzer.

The bitmap table 4004 shows bitmap data which is graphics data superimposed on video image data by the broadcast reception apparatus 101, where the bitmaps in the bitmap table 4004 correspond to those in the object definition table 4002.

For example, the bitmap with index number "6" in the bitmap table corresponds to the normal bitmap for the object with index number "0" in the object definition table 4002.

Note that the "input operation" defined in NVT (0,2) of Embodiment 1 (see the script information shown in FIG. 3) is achieved by handlers in the navigation information table 4001 of FIG. 40. Accordingly, the value specified as variable X in Embodiment 1 has no substantial meaning.

The navigation information in the above embodiments does not define hyperlink information. However, a hyperlink table showing link targets may be used when the navigation information defines hyperlink information.

The broadcast reception apparatus 101 or the like described in Embodiments 1–4 may be recorded as a program in a record medium, such as a ROM card, the program realizing the functions of the reception control unit, the reproduction control unit, and other elements shown in FIG. 1. This enables a broadcast reception apparatus to have the functions of the broadcast reception apparatus 101 of the present invention by inserting the ROM card into a card slot of the broadcast reception apparatus.

Industrial Use Possibility

The broadcast reception apparatus of the present invention is very useful in that it can separate only necessary pieces of navigation information from a transport stream into which video data and a plurality of pieces of navigation information are multiplexed and that it can generate and display a composite image using data specified by the separated navigation information. The function of providing different user interfaces for corresponding users has a high practical merit.

What is claimed is:

1. A broadcast reception apparatus for receiving broadcast data as a transport stream, wherein the transport stream includes video data and a plurality of navigation information sequences, each of the plurality of navigation information sequences includes navigation information which includes graphics data to be combined with the video data for display, the broadcast reception apparatus comprising:

extracting means for extracting the video data and navigation information from the transport stream;

apparatus information type storage means for prestoring information indicating a type of a navigation information sequence from which the navigation information is to be extracted;

extract controlling means for controlling the extracting means so that the extracting means extracts navigation information from one out of the plurality of navigation information sequences according to the information stored in the navigation information type storage means;

navigation information storage means for storing the navigation information extracted by the extracting means; and reproduction controlling means for combining graphics data included in the navigation information stored in the navigation information storage means with the video data extracted by the extracting means and displaying a composite image which is a result of this combination.

2. The broadcast reception apparatus of claim 1, wherein each piece of navigation information includes display position information and time information, the display position information indicating a position for displaying graphics data, the time information indicating a time period during which graphics data is displayed, wherein the reproduction controlling means combines graphics data with the video data in accordance with the display position information and displays a composite image in accordance with the time information.

3. A broadcast reception apparatus for receiving broadcast data as a transport stream, wherein the transport stream includes video data and a plurality of navigation information sequences, each of the plurality of navigation information sequences includes navigation information which includes graphics data to be combined with the video data for display, the broadcast reception apparatus comprising:

extracting unit for extracting the video data and navigation information from the transport stream;

extract controlling unit for controlling the extracting unit so that the extracting unit extracts navigation information from one out of the plurality of navigation information sequences which is related to the broadcast reception apparatus;

navigation information storage unit for storing the navigation information extracted by the extracting unit;

reproduction controlling unit for combining graphics data included in the navigation information stored in the navigation information storage unit with the video data extracted by the extracting unit and displaying a composite image which is a result of this combination;

operation receiving unit for receiving a user operation; and apparatus information storage unit for storing relationships between a plurality of equipment operation and a plurality of identifiers of the plurality of navigation information sequences, the operation equipment being operated by a user to send user operations to the operations receiving unit, wherein the operation receiving unit includes:

a signal receiving unit for receiving a signal which specifies one out of the plurality of operation equipment which is used for the user operation received by the operation receiving unit, and the extract controlling unit includes:

an extract condition setting unit for obtaining from the apparatus information storage unit an identifier of a navigation information sequence which corresponds to the operation equipment specified by the signal received by the signal receiving unit and setting a condition for extracting navigation information in the extracting unit.

4. The broadcast reception apparatus of claim 3, wherein each of the plurality of navigation information sequences includes a plurality of sets of pieces of navigation information, the plurality of sets of pieces of navigation information corresponding to respective time periods, and each set of pieces of navigation information being formed by repeatedly multiplexing a piece of navigation information during a corresponding time period, and wherein the extract condition setting unit sets a condition for extracting navigation information in accordance with a time period.

5. The broadcast reception apparatus of claim 2, wherein the plurality of operation equipment include a remote controller for adults and a remote controller for children, and the plurality of navigation information sequences are a navigation information sequence for adults and a navigation information sequence for children.

6. A broadcast reception apparatus for receiving broadcast as a transport stream, wherein the transport stream includes video data and a plurality of navigation information sequences, each of the plurality of navigation information sequences includes navigation information which includes graphics data to be combined with the video data for display, the broadcast reception apparatus comprising:

extracting unit for extracting the video data and navigation information from the transport stream;

extract controlling unit for controlling the extracting means so that the extracting unit extracts navigation information from one out of the plurality of navigation information sequences which is related to the broadcast reception apparatus;

navigation information storage unit for storing the navigation information extracted by the extracting means;

reproduction controlling unit for combining graphics data included in the navigation information stored in the navigation information storage unit with the video data extracted by the extracting unit and displaying a composite image which is a result of this combination;

apparatus information storage unit for storing relationships between display screens and a plurality of identifiers of the plurality of navigation information sequences, the display screens displaying the composite image combined by the reproduction controlling unit, wherein the extract controlling unit includes:

an extract condition setting unit for receiving information indicating one out of the display screens from the reproduction controlling unit, obtaining from the apparatus information storage unit an identifier of a navigation information sequence which corresponds to the display screen indicated by the information received from the reproduction controlling unit, and setting a condition for extracting navigation information in the extracting unit.

7. The broadcast reception apparatus of claim 6, wherein
the display screens includes a wide screen with aspect ratio 16:9, a normal screen with aspect ratio 4:3, and a small-scale LCD (Liquid Crystal Display),
navigation information corresponding to the wide screen includes display position information with indicates a position for displaying graphics data, the position being a right-hand side and a left-hand side blank areas generated when a normal-size image is displayed on the wide screen, navigation information corresponding to the normal screen includes display position information which indicates a position for displaying graphics data, the position being a top and bottom blank areas generated when a wide-size image is displayed on the normal screen, and navigation information corresponding to the small-scale LCD includes display position information which indicates a position for displaying graphics data, the position being almost a whole display area,
the extract controlling unit includes:
a size receiving unit for receiving image size information specifying either of a wide size and a normal size concerning an image of the video data; and
a display instructing unit for instructing the reproduction controlling unit to display the graphics data on a display screen at a position indicated by the display position information in accordance with the information indicating one out of the display screens received from the reproduction controlling unit and in accordance with the image size information received by the size receiving unit.

8. A broadcast reception apparatus for receiving broadcast data as a transport stream, wherein the transport stream includes video data and a plurality of navigation information sequences, each of the plurality of navigation information sequences includes navigation information which includes graphics data to be combined with the video data for display, the broadcast reception apparatus comprising:
extracting unit for extracting the video data and navigation information from the transport stream;
extract controlling unit for controlling the extracting unit so that the extracting unit extracts navigation information from one out of the plurality of navigation information sequences which is related to the broadcast reception apparatus;
navigation information storage unit for storing the navigation information extracted by the extracting unit;
reproduction controlling unit for combining graphics data included in the navigation information stored in the navigation information storage unit with the video data extracted by the extracting unit and displaying a composite image which is a result of this combination;
operation receiving unit for receiving a user operation;
a modem connected to a public network; and
apparatus information storage unit for storing a telephone number of a connection destination to which the modem is connected, wherein
the extract controlling unit includes:
an authority checking unit for reading the telephone number, connecting to the connection destination by the modem, and checking whether a pay broadcast program is to be viewed when the extracting unit extracts video data of the pay broadcast program and the operation receiving unit receives a user operation indicating that the user selects the pay broadcast program;
a first extract condition setting unit, when the authority checking unit receives a confirmation that the pay broadcast program is to be viewed, for setting a condition in the extracting unit for extracting navigation information included in a navigation information sequence related to the confirmation that the pay broadcast program is to be viewed; and
a second extract condition setting unit, when the authority checking unit receives an answer that the pay broadcast program is not to be viewed, for setting a condition in the extracting unit for extracting navigation information included in a navigation information sequence related to the answer that the pay broadcast program is not to be viewed.

9. The broadcast reception apparatus of claim 8, wherein
the authority checking unit receives information of a permitted audience time period together with the confirmation that the pay broadcast program is to be viewed,
the extract controlling unit includes:
a timer unit for activating the second extract condition setting unit when the permitted audience time period has expired.

10. A broadcast reception apparatus for receiving broadcast data as a transport stream, wherein the transport stream includes video data and a plurality of pieces of navigation information which includes graphics data to be combined with the video data for display, the broadcast reception apparatus comprising:
operation receiving unit for receiving a user operation;
extracting unit for extracting the video data and navigation information from the transport stream;
extract controlling unit for controlling the extracting means so that the extracting unit extracts two or more pieces of navigation information out of the plurality of pieces of navigation information in accordance with the user operation received by the operation receiving unit;
navigation information storage unit for storing the two or more pieces of navigation information extracted by the extracting unit;
apparatus information storage unit for storing information indicating a navigation information sequence in which the navigation information is to be extracted; and
reproduction controlling means for combining graphics data included in the two or more navigation information stored in the navigation information storage unit with the video data extracted by the extracting unit and displaying a composite image which is a result of this combination.

11. The broadcast reception apparatus of claim 10, wherein
the user operation received by the operation receiving unit is a user attribute, and
each of the plurality of pieces of navigation information includes graphics data corresponding to a user attribute.

12. The broadcast reception apparatus of claim 11 further comprising:
a modem connected to a public network, wherein
the apparatus information storage unit stores a telephone number of a connection destination to which the modem is connected; and transmitting unit for transmitting data to the connection destination by the modem, the data corresponding to a response by a user to the graphics data displayed by the reproduction controlling unit.

13. A computer-readable record medium to be used for a broadcast reception apparatus, wherein the broadcast reception apparatus receives broadcast data as a transport stream, the transport stream includes video data and a plurality of navigation information sequences, each of the plurality of navigation information sequences includes navigation information which includes graphics data to be combined with the video data for display, the computer-readable record medium recording a program which is run on the broadcast reception apparatus and includes:

an extracting step for extracting the video data and navigation information from the transport stream;

an extract controlling step for controlling the extracting step so that the extracting step extracts navigation information from one out of the plurality of navigation information sequences according to information stored in a apparatus information storage unit, the information indicating a type of a navigation information sequence from which the navigation information is to be extracted;

a navigation information storage step for storing the navigation information extracted by the extracting step into a navigation information storage unit; and a reproduction controlling step for combining graphics data included in the navigation information stored in the navigation information storage unit with the video data extracted by the extracting step and displaying a composite image which is a result of this combination.

14. A record medium to be used for a broadcast reception apparatus, wherein the broadcast reception apparatus receives broadcast data as a transport stream, wherein the transport stream includes video data and a plurality of pieces of navigation information which includes graphics data to be combined with the video data for display, the broadcast reception apparatus comprises: an extracting unit for extracting the video data and navigation information from the transport stream; apparatus information storage means for prestoring information indicating a type of a navigation information sequence from which the navigation information is to be extracted; and a navigation information storage means for storing two or more pieces of navigation information extracted by the extracting means, a program is recorded in the record medium, the program includes:

a determining step for determining a user operation;

an extract controlling unit for controlling the extracting unit so that the extracting unit extracts the two or more pieces of navigation information out of the plurality of pieces of navigation information in accordance with the user operation determined in the determining step and the information stored in the navigation information type storage means;

a combining step for combining together two or more pieces of graphics data included in the two or more navigation information stored in the navigation information storage unit; and a combination displaying step for combining the graphics data combined in the combining step with the video data extracted by the extracting unit and displaying a composite image which is a result of this combination.

* * * * *